(12) United States Patent
Hiraki et al.

(10) Patent No.: US 11,722,052 B2
(45) Date of Patent: Aug. 8, 2023

(54) CONTROL METHOD, CONTROLLER, AND CONTROL SYSTEM FOR CONTROLLING A POWER CONVERTER INCLUDING A RESONANT CIRCUIT

(71) Applicant: NATIONAL UNIVERSITY CORPORATION OKAYAMA UNIVERSITY, Okayama (JP)

(72) Inventors: Eiji Hiraki, Okayama (JP); Kazuhiro Umetani, Okayama (JP); Kouta Shimomura, Okayama (JP)

(73) Assignee: NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 0 days.

(21) Appl. No.: 17/580,239

(22) Filed: Jan. 20, 2022

(65) Prior Publication Data
US 2023/0093890 A1    Mar. 30, 2023

(30) Foreign Application Priority Data

Sep. 29, 2021 (JP) ................................ 2021-159624

(51) Int. Cl.
*H02M 3/335* (2006.01)
*H02M 1/15* (2006.01)
(Continued)

(52) U.S. Cl.
CPC .............. *H02M 1/15* (2013.01); *H02M 1/143* (2013.01); *H02M 3/01* (2021.05); *H02M 3/33592* (2013.01)

(58) Field of Classification Search
CPC ..... H02M 1/15; H02M 1/143; H02M 3/33592
See application file for complete search history.

(56) References Cited

U.S. PATENT DOCUMENTS 6,711,034 B2 * 3/2004 Duerbaum .......... H02M 3/3376
363/16
9,525,358 B2 * 12/2016 Jin .......................... H02M 1/38
(Continued)

OTHER PUBLICATIONS

Umetani et al., "A Control Method Based on Power Factor for Improving Output Voltage Stability and Efficiency of LLC Converter in Wide Range of Output Voltage and Load Impedance," 2021 IEEE, pp. 3436-3443.
(Continued)

*Primary Examiner* — Yusef A Ahmed
(74) *Attorney, Agent, or Firm* — Oliff PLC

(57) ABSTRACT

A control method, a controller, and a control system including a converter and the controller are provided to improve load responsiveness of control by the converter. The converter has a primary circuit that includes a voltage generation circuit for generating a square wave and a resonant circuit for converting a waveform of the generated square wave, and a secondary circuit that is electromagnetically coupled to the primary circuit and that generates an induced electromotive force. The controller controls the voltage generation circuit by a control target power factor. To implement power factor-based control, the controller controls the voltage generation circuit, based on a derived power factor derived from an active power and an apparent power relevant to the resonant circuit in the primary circuit or a derived power factor derived from a phase of the primary circuit.

12 Claims, 26 Drawing Sheets

(51) Int. Cl.
 *H02M 1/14* (2006.01)
 *H02M 3/00* (2006.01)

(56) References Cited

U.S. PATENT DOCUMENTS

| | | | | |
|---|---|---|---|---|
| 9,812,975 | B2* | 11/2017 | Chen | H02M 3/33546 |
| 9,882,498 | B2* | 1/2018 | Watanabe | H02M 3/33546 |
| 9,912,244 | B2* | 3/2018 | Chen | H02M 1/32 |
| 10,186,975 | B2* | 1/2019 | Ouyang | H02M 1/08 |
| 10,715,048 | B2* | 7/2020 | Miao | H02M 3/33571 |
| 10,868,472 | B2* | 12/2020 | Yeh | H02M 3/01 |
| 11,362,593 | B2* | 6/2022 | Ouyang | H02M 3/33571 |
| 2009/0244934 | A1* | 10/2009 | Wang | H02M 3/3378 |
| | | | | 363/21.06 |
| 2011/0096571 | A1* | 4/2011 | Usuda | H02M 3/157 |
| | | | | 363/21.1 |
| 2011/0175587 | A1* | 7/2011 | Hosotani | H02M 3/33515 |
| | | | | 323/283 |
| 2011/0176335 | A1* | 7/2011 | Li | H02M 3/3376 |
| | | | | 363/21.02 |
| 2012/0020118 | A1* | 1/2012 | Takaki | H02M 3/33507 |
| | | | | 363/16 |
| 2012/0163037 | A1* | 6/2012 | Hong | H02M 3/3387 |
| | | | | 363/21.02 |
| 2012/0262954 | A1* | 10/2012 | Duvnjak | H02M 1/4258 |
| | | | | 363/21.02 |
| 2013/0229829 | A1* | 9/2013 | Zhang | H02M 3/3376 |
| | | | | 363/16 |
| 2014/0036547 | A1* | 2/2014 | Matsuura | H02M 3/33507 |
| | | | | 363/21.02 |
| 2014/0140113 | A1* | 5/2014 | Oh | H02M 1/4241 |
| | | | | 363/89 |
| 2014/0160805 | A1* | 6/2014 | Oh | H02M 1/4258 |
| | | | | 363/21.02 |
| 2015/0023066 | A1* | 1/2015 | Kawashima | H02M 3/33546 |
| | | | | 363/21.02 |
| 2015/0280545 | A1* | 10/2015 | Afsharian | H02M 1/08 |
| | | | | 363/21.02 |
| 2016/0087544 | A1* | 3/2016 | Jin | H02M 1/32 |
| | | | | 363/21.02 |
| 2016/0190945 | A1* | 6/2016 | Liu | H02M 1/32 |
| | | | | 363/21.02 |
| 2017/0179833 | A1* | 6/2017 | Adragna | H02M 3/335 |
| 2019/0006940 | A1* | 1/2019 | Jans | H02M 1/08 |
| 2020/0195154 | A1* | 6/2020 | Mayell | H02M 3/33569 |
| 2021/0328500 | A1* | 10/2021 | Lu | H02M 1/0025 |
| 2021/0351709 | A1* | 11/2021 | Uematsu | H02M 3/33571 |
| 2022/0286056 | A1* | 9/2022 | Chiu | H02M 1/0058 |

OTHER PUBLICATIONS

Shimomura et al., "A New Control Method for Resonant Converters Based on Power Factor."

Guidong Zhang et al. "Control Design and Performance Analysis of a Double-Switched LLC Resonant Rectifier for Unity Power Factor and Soft-Switching". IEEE Access, 2020, vol. 8, pp. 14511-44521.

Jiepin Zhang et al. "An LLC-LC Type Bidirectional Control Strategy for an LLC Resonant Converter in Power Electronic Traction Transformer". IEEE Transactions on Industrial Electronics, Nov. 2018, vol. 65, No. 11, pp. 8595-8604.

Mohamed Salem et al. "Three-Phase Series Resonant DC-DC Boost Converter With Double LLC Resonant Tanks and Variable Frequency Control". IEEE Access, 2020, vol. 8, pp. 22386-22399.

Chao Fei et al. "Digital Implementation of Adaptive Synchronous Rectifier (SR) Driving Scheme for High-Frequency LLC Converters With Microcontroller". IEEE Transactions on Power Electronics, Jun. 2018, vol. 33, No. 6, pp. 5351-5361.

Sheng Zong et al. "Theoretical Evaluation of Stability Improvement Brought by Resonant Current Loop for Paralleled LLC Converters". IEEE Transactions on Industrial Electronics, Jul. 2015, vol. 62, No. 7, pp. 4170-4180.

Franco Degioanni et al. "Dual-Loop Controller for LLC Resonant Converters Using an Werage Equivalent Model". IEEE Transactions on Power Electronics, Nov. 2018, vol. 33, No. 11, pp. 9875-9889.

Richard (Hua) Yang et al. "Investigation on the Small Signal Characteristic Based on the LLC Hybrid Hysteretic Charge Control". CPSS Transactions on Power Electronics and Applications, Jun. 2019, vol. 4, No. 2, pp. 128-142.

* cited by examiner

US 11,722,052 B2

CONTROL METHOD, CONTROLLER, AND CONTROL SYSTEM FOR CONTROLLING A POWER CONVERTER INCLUDING A RESONANT CIRCUIT

TECHNICAL FIELD

The present invention relates to a control method for controlling a power converter that includes a resonant circuit, a controller for controlling the power converter, and a control system that includes the power converter and the controller.

BACKGROUND ART

A resonant power converter has a primary circuit using, for example, an LC resonant circuit such as an LLC converter and a secondary circuit electromagnetically coupled to the primary circuit, and converts power by rectifying an output from the secondary circuit. Such a resonant power converter has received attention in some fields. For example, the resonant power converter such as an LLC converter, in which semiconductor switching elements are turned on and off by soft switching, is highly efficient and thus is expected in applications that need to cope with heat dissipation from the power converter, such as an on-board DC/DC converter and a Point-of-Load power supply for information equipment.

Various control methods have been proposed for such a resonant power converter. Some methods implement feedback control based on frequency control by decreasing the frequency when an output voltage is lower than a target value and increasing the frequency when the output voltage is higher than the target value (see NPL 1 to NPL 4). Other methods implement feedback control by feeding back not only an output voltage but also a resonant current (see NPL 5 to NPL 7).

CITATION LIST

Patent Literature

[NPL 1]
GUIDONG ZHANG, JUNMING ZENG, SAMSON SHENGLONG YU, WENXUN XIAO, BO ZHANG, SIZHE CHEN, AND YUN ZHANG, "Control Design and Performance Analysis of a Double-Switched LLC Resonant Rectifier for Unity Power Factor and Soft-Switching," IEEE Access (Volume: 8), pages 44511-44521, 23 Feb. 2018.

[NPL 2]
Jiepin Zhang, Jianqiang Liu, Jingxi Yang, Nan Zhao, Yang Wang and Trillion Q. Zheng, "A LLC-LC Type Bidirectional Control Strategy for LLC Resonant Converter in Power Electronic Traction Transformer," IEEE Transactions on Industrial Electronics (Volume: 65, Issue: 11, November 2018), pages 8595-8604, 23 Feb. 2018.

[NPL 3]
MOHAMED SALEM, VIGNA K. RAMACHANDARAMURTHY, AWANG JUSOH, SANJEEVIKUMAR PADMANABAN, MOHAMAD KAMAROL, JIASHEN TEH, AND DAHAMAN ISHAK, "Three-Phase Series Resonant DC-DC Boost Converter with Double LLC Resonant Tanks and Variable Frequency Control," IEEE Access (Volume: 8), pages 22386-22399, 27 Jan. 2020.

[NPL 4]
Chao Fei, Qiang Li, Fred C. Lee, Life Fellow, "Digital Implementation of Adaptive Synchronous Rectifier (SR) Driving Scheme for High-frequency LLC Converters with Microcontroller," IEEE Transactions on Power Electronics (Volume: 33, Issue: 6, June 2018), pages 5351-5361, 25 Jul. 2017.

[NPL 5]
Sheng Zong, Haoze Luo, Wuhua Li, Xiangning He, and Changliang Xia, "Theoretical Evaluation of Stability Improvement Brought by Resonant Current Loop for Paralleled LLC Converters," IEEE Transactions on Industrial Electronics (Volume: 62, Issue: 7, July 2015), pages 4170-4180, 23 Dec. 2014.

[NPL 6]
Franco Degioanni, Ignacio Galiano Zurbriggen, and Martin Ordonez, "Dual-Loop Controller for LLC Resonant Converters Using an Average Equivalent Model," IEEE Transactions on Power Electronics (Volume: 33, Issue: 11, Nov. 2018), pages 9875-9889, 21 Dec. 2017.

[NPL 7]
Richard (Hua) Yang, Brent A. McDonald, and Yalong Li, "Investigation on the Small Signal Characteristic Based on the LLC Hybrid Hysteretic Charge Control," CPSS Transactions on Power Electronics and Applications (Volume: 4, Issue: 2, June 2019), pages 128-142, 11 Jul. 2019.

SUMMARY OF INVENTION

Technical Problem

Unfortunately, the feedback control based on the frequency control and the feedback control that additionally feeds back the resonant current cannot ensure satisfactory load responsiveness.

In light of these circumstances, it is a main object of the present invention to provide a control method that is expected to improve load responsiveness.

It is another object of the present invention to provide a controller to which the control method according to the present invention is applied.

It is yet another object of the present invention to provide a control system that includes the controller according to the present invention.

Solution to Problem

To achieve the above objects, an aspect of the present disclosure relates to a control method for controlling a power converter that includes a voltage generation circuit for generating a voltage waveform containing an alternating current and a resonant circuit for converting the generated voltage waveform. The method involves controlling the voltage generation circuit by a control target power factor that is a desired value for control.

Another aspect of the present disclosure relates to a controller for controlling a power converter that includes a voltage generation circuit for generating a voltage waveform containing an alternating current and a resonant circuit for converting the generated voltage waveform. The controller includes a voltage generation circuit control unit that controls the voltage generation circuit by a control target voltage corresponding to a control target power factor that is a desired value for control.

Yet another aspect of the present disclosure relates to a controller for controlling a power converter that includes a voltage generation circuit for generating a voltage waveform containing an alternating current and a resonant circuit for converting the generated voltage waveform. The controller includes: a comparator unit that compares a value relating to an output from the power converter, with a target value thereof; a target control unit that derives a control target voltage that is a desired value for control, based on a result of a comparison by the comparator unit; and a voltage generation circuit control unit that controls the voltage generation circuit by a control target power factor corresponding to the control target voltage derived by the target control unit.

In the controller according to either of the above aspects, the voltage generation circuit control unit controls the voltage generation circuit such that a derived power factor achieves the control target power factor. The derived power factor is derived in the resonant circuit, from an active power and an apparent power relevant to an alternating current wave supplied from the voltage waveform generated by the voltage generation circuit.

In the controller according to either of the above aspects, the voltage generation circuit control unit controls the voltage generation circuit, based on a derived power factor. The derived power factor is derived as a ratio of an active power to an apparent power. The active power is derived from a voltage across a resonant capacitor provided in the resonant circuit or a current through the resonant circuit and from a voltage waveform that is generated in the voltage generation circuit and that changes over time. The apparent power is derived from the resonant capacitor voltage and an amplitude of the resonant capacitor.

In the controller according to either of the above aspects, the voltage generation circuit control unit includes: an amplitude acquisition circuit that acquires a voltage across a resonant capacitor provided in the resonator circuit and then acquires, from the resonant capacitor voltage, an amplitude of the resonant capacitor voltage; a control target derivation circuit that derives, from the amplitude of the resonant capacitor voltage, a control target resonant capacitor voltage that is a desired value for control; and a control signal output circuit for controlling the voltage generation circuit, the control signal output circuit outputting at least one voltage generation circuit control signal for controlling the voltage generation circuit, based on a result of a comparison in which an absolute value of the resonant capacitor voltage is compared with the control target resonant capacitor voltage derived by the control target derivation circuit.

In the controller according to either of the above aspects, the voltage generation circuit control unit controls the voltage generation circuit such that a derived power factor achieves the control target power factor. The derived power factor is derived from a current through the resonant circuit.

In the controller according to either of the above aspects, the voltage generation circuit control unit includes: a reference phase acquisition circuit that acquires a voltage across a resonant capacitor provided in the resonant circuit and then acquires a reference phase based on the resonant capacitor voltage, the reference phase serving as a reference for a phase of a current through the resonant circuit; a waveform generation circuit that generates, from the reference phase acquired by the reference phase acquisition circuit, a time-varying waveform that changes over time; a phase difference calculation circuit that calculates, based on a target phase difference that is a desired phase difference and also based on the time-varying waveform generated by the waveform generation circuit, a target value in the time-varying waveform as a value corresponding to the target phase difference; and a control signal output circuit for controlling the voltage generation circuit, the control signal output circuit outputting at least one voltage generation circuit control signal for controlling the voltage generation circuit, based on the time-varying waveform generated by the waveform generation circuit and the target value calculated by the phase difference calculation circuit.

In the controller according to either of the above aspects, the waveform generation circuit generates a sawtooth wave as the time-varying waveform, a voltage of the sawtooth wave changing over time along a substantially uniform slope in a time period from the reference phase acquired by the reference phase acquisition circuit until a next reference phase. The phase difference calculation circuit calculates a value of a voltage corresponding to the target phase difference as a target phase difference voltage, in the voltage of the sawtooth wave that changes over time along the substantially uniform slope. The control signal output circuit for controlling the voltage generation circuit outputs the voltage generation circuit control signal, based on a result of a comparison in which the voltage of the sawtooth wave generated by the waveform generation circuit is compared with the target phase difference voltage calculated by the phase difference calculation circuit.

A further aspect of the present disclosure relates to a control system including: a power converter that includes a voltage generation circuit for generating a voltage waveform containing an alternating current and a resonant circuit for converting the generated voltage waveform; and the controller according to either of the above aspects for controlling the voltage generation circuit.

Advantageous Effects of Invention

In the control method, the controller, and the control system according to the present invention, the power converter including the resonant circuit is controlled by the power factor-based control. As a result, the control method, the controller, and the control system according to the present invention provide remarkable effects and, for example, are expected to improve load responsiveness.

DESCRIPTION OF EMBODIMENTS

Embodiments of the present invention are hereinafter described with reference to the drawings.

APPLICATION EXAMPLE

A control method according to the present disclosure is applied to control, for example, a resonant converter. The resonant converter has a primary circuit using an LC resonant circuit such as an LLC converter and a secondary circuit electromagnetically coupled to the primary circuit, and converts power by rectifying an output from the secondary circuit. Such a resonant converter is applied to a DC/DC converter, a Point-of-Load power supply, and other like uses. In the following description of the control method according to the present disclosure, a control system CS that includes a converter 1 and a controller 2 for controlling the converter 1 is taken as an example and described with reference to the drawings.

<Control System>

Figure 1:
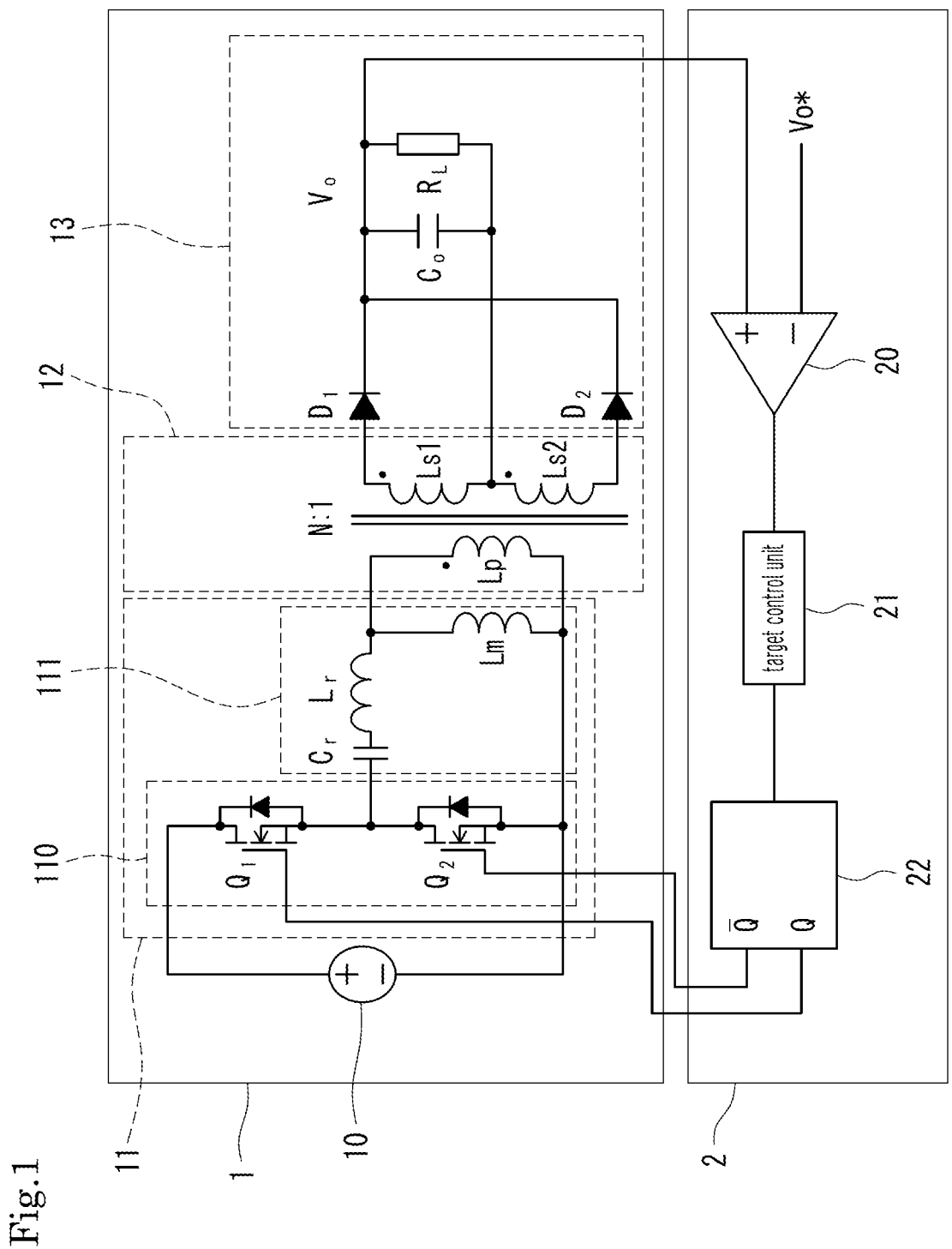
FIG. 1 is a block diagram showing a configuration example of a control system according to the present disclosure.

FIG. 1 is a block diagram showing a configuration example of the control system CS according to the present disclosure. The control system CS in the present disclosure includes, for example, a converter 1 serving as a DC/DC converter and a controller 2 for controlling the converter 1. The converter 1 includes various components such as an input power source 10, a primary circuit 11, a coupling circuit 12, and a secondary circuit 13. The controller 2 includes various components such as a comparator unit 20, a target control unit 21, and a control signal output circuit 22 for controlling a voltage generation circuit.

<Converter>

In the converter 1, the input power source 10 is a DC power source and supplies DC power to the converter 1. The input power source 10 is, for example, a DC power source of about 140V obtained by rectification of a commercial AC power source of 100V. In this case, the voltage needs to be stepped down.

The coupling circuit 12 insulates an input and an output of the converter 1 from each other. The input-side primary circuit 11 includes a voltage generation circuit 110 connected to the input power source 10 and serving as a switching circuit, a resonant circuit 111 connected to the voltage generation circuit 110, and other like components.

The voltage generation circuit 110 is configured as a half-bridge circuit in which a first switching element Q1 and a second switching element Q2 are connected in series with the input power source 10. The switching elements Q1, Q2 are semiconductor switches such as metal-oxide-semiconductor field-effect transistors (MOSFETs), insulated gate bipolar transistors (IGBTs), or other like devices. In the embodiments described herein, the switching elements Q1, Q2 are n-channel MOSFETs. Gate terminals of the switching elements Q1, Q2 are connected to the controller 2, specifically to the control signal output circuit 22 for controlling the voltage generation circuit.

The resonant circuit 111 is an LLC resonant converter in which a resonant capacitor $C_r$, a leakage inductance $L_r$, and a magnetizing inductance $L_m$ are connected in series.

The coupling circuit 12 is a transformer that includes a primary winding $L_p$ and two series-connected secondary windings $L_s1$, $L_s2$. The coupling circuit 12 electromagnetically couples the primary circuit 11 and the secondary circuit 13. The primary winding $L_p$ is connected in parallel with the magnetizing inductance $L_m$ of the resonant circuit 111. The secondary windings $L_s1$, $L_s2$ are connected to the secondary circuit 13. The turns ratio of the primary winding $L_p$ to the secondary windings $L_s1$, $L_s2$ is N:1.

The secondary circuit 13 includes output diodes D1, D2, an output capacitor $C_o$, and other like components. The secondary circuit 13 is connected to a load $R_L$ to which the power is output. The output diodes D1, D2 are a pair of rectifier elements connected to opposite ends of the secondary windings $L_s1$, $L_s2$. In the secondary circuit 13, the alternating current generated in the coupling circuit 12 is rectified by the output diodes D1, D2 and smoothed by the output capacitor $C_o$ to produce a DC output voltage $V_o$. The DC output voltage $V_o$ is output to the load $R_L$.

<Controller>

The controller 2, to be described below, includes the comparator unit 20, the target control unit 21, the control signal output circuit 22 for controlling the voltage generation circuit, and other components.

The comparator unit 20 is an error comparator circuit that compares the output voltage $V_o$ received from the secondary circuit 13 with a target voltage $V_o^*$ representing a desired output, from the converter 1. The target voltage $V_o^*$ may be set in advance or may be input externally. The comparator unit 20 compares the output voltage $V_o$ with the target voltage $V_o^*$, derives a result of the comparison (for example, a difference between the output voltage $V_o$ and the target voltage $V_o^*$), and outputs the derived comparison result to the target control unit 21.

The target control unit 21 is configured, for example, using an PI controller. By PI control based on the comparison result supplied from the comparator unit 20 and an integral thereof, the target control unit 21 derives a control target voltage that is a desired value for control. The derived control target voltage is output to the control signal output circuit 22 for controlling the voltage generation circuit.

The control signal output circuit 22 for controlling the voltage generation circuit is a circuit for controlling the converter 1 by a control target power factor that corresponds to the control target voltage. The control target power factor is a power factor that is a desired value for control. The controller 2 controls the converter 1 by power factor-based control. The control signal output circuit 22 for controlling the voltage generation circuit is connected to the voltage generation circuit 110 provided in the primary circuit 11 of the converter 1. The control signal output circuit 22 for controlling the voltage generation circuit outputs control signals for controlling the voltage generation circuit (hereinafter referred to as "voltage generation circuit control signal(s)") to the gate terminals of the switching elements Q1, Q2 that constitute the voltage generation circuit 110, and thereby controls the switching elements Q1, Q2. The voltage generation circuit control signals, which are output from the control signal output circuit 22 for controlling the voltage generation circuit, are intended to control the voltage generation circuit 110 provided in the converter 1. Note that the voltage generation circuit control signals, which are output from the control signal output circuit 22 for controlling the voltage generation circuit, include signals for causing the voltage generation circuit 110 to function as a switching power supply. This type of signal is called "switching signal" in the following description.

<Principle of Power Factor Control>

Figure 2:
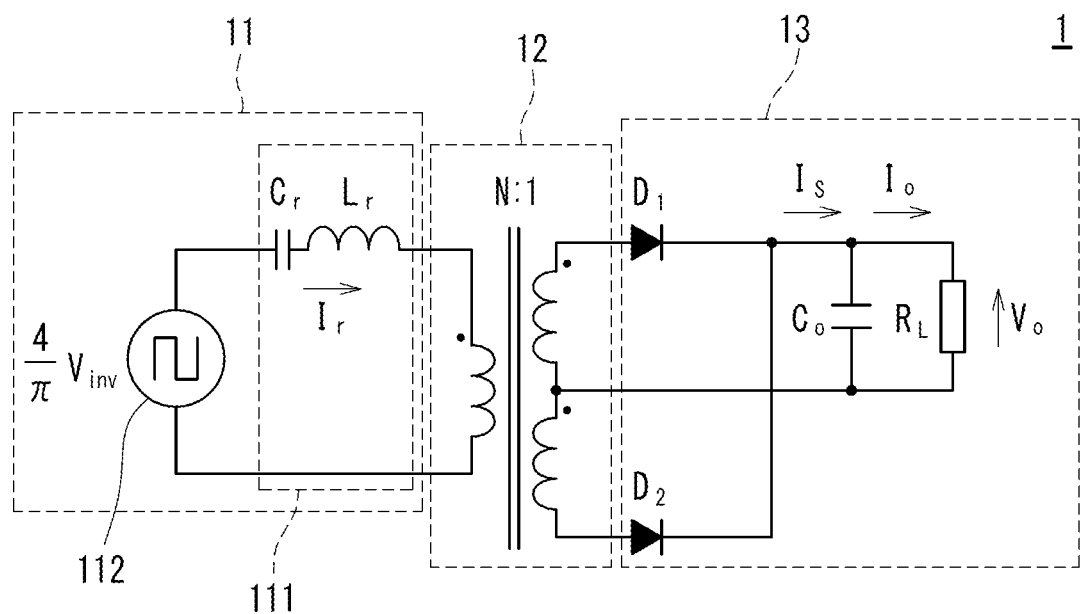
FIG. 2 is a circuit diagram showing an example of an equivalent circuit of a converter provided in the control system according to the present disclosure.

The next description relates to the principle of power factor control in the control system CS according to the present disclosure. FIG. 2 is a circuit diagram showing an example of an equivalent circuit of the converter 1 provided in the control system CS according to the present disclosure. In the equivalent circuit of the converter 1 shown in FIG. 2, a square wave source 112 represents the DC input power source 10 and the voltage generation circuit 110. For simplicity, the following description refers to the equivalent circuit in FIG. 2, on the assumption that the magnetizing inductance $L_m$ is large enough and an input voltage $V_{inv}$ transmitted from the square wave source 112 contains only the fundamental component.

In the equivalent circuit illustrated in FIG. 2, an active power in the steady state is equal to an output power consumed by the load $R_L$. In this case, the output voltage $V_o$ can be represented by Formula 1 below using a power factor. It is obvious that the power factor control according to Formula 1, which does not involve a resistance of the load $R_L$, can control the output power irrespective of the load $R_L$.

$$V_o = (V_{inv}/N)\cos\theta \qquad \text{Formula 1}$$

where $V_o$: output voltage $V_{inv}$: input voltage

N: turns ratio

θ: phase difference between an amplitude of the input voltage and an amplitude of a primary current cos θ: power factor In the equivalent circuit illustrated in FIG. 2, the input power can be represented by Formula 2 below using the input voltage $V_{inv}$, the amplitude of the primary current $I_r$, and the power factor cos θ. The secondary transmitted power $P_{se}$ transmitted to the secondary circuit 13 can be represented by Formula 3 below using the output voltage $V_o$.

$$P_{in} = (2/\pi)V_{inv}I_r\cos\theta \qquad \text{Formula 2}$$

where $P_{in}$: input power $V_{inv}$: input voltage $I_r$: amplitude of the primary current $$P_{se} = (2/\pi)NI_rV_o \qquad \text{Formula 3}$$

where $P_{se}$: secondary transmitted power

N: turns ratio $I_r$: amplitude of the primary current $V_o$: output voltage

The difference between the input power $P_{in}$ and the secondary transmitted power $P_{se}$ represents power stored in the primary circuit 11. The power stored in the primary circuit 11 is equal to power stored in the resonant circuit 111. These relationships can be represented by Formula 4 below.

[Mathematical Formula 1]

$$P_{in} - P_{se} = P_r = \frac{d}{dt}\left(\frac{1}{2}L_rI_r^2\right) \qquad \text{Formula 4}$$

where $P_{in}$: input power $P_{se}$: induced electromotive force $P_r$: power consumed in the primary circuit $L_r$: leakage inductance $I_r$: amplitude of the primary current The relationships of Formulas 2 to 4 give Formula 5 below.

[Mathematical Formula 2]

$$P_{in} - P_{se} = \frac{2}{\pi} V_{inv} I_r \cos\theta - \frac{2}{\pi} N I_r V_o = \frac{d}{dt}\left(\frac{1}{2} L_r I_r^2\right) \quad \text{Formula 5}$$

where
- $P_{in}$: input power
- $P_{se}$: induced electromotive force
- $V_{inv}$: input voltage
- $I_r$: amplitude of the primary current
- $\cos\theta$: power factor
- N: turns ratio
- $V_o$: output voltage
- $L_r$: leakage inductance In the secondary circuit 13, power consumed by the load $R_L$ can be represented by Formula 6 below, and power stored in the output capacitor $C_o$ can be represented by Formula 7 below.

$$P_{out} = V_o I_o \quad \text{Formula 6}$$

where
- $P_{out}$: power consumed by the load
- $V_o$: output voltage
- $I_o$: DC component of the output current

[Mathematical Formula 3]

$$P_{cap} = \frac{d}{dt}\left(\frac{1}{2} C_o V_o^2\right) \quad \text{Formula 7}$$

where
- $P_{cap}$: power consumed by the output capacitor
- $C_o$: capacitance of the output capacitor
- $V_o$: output voltage Power stored in the secondary circuit 13 is equal to the sum of the power consumed by the load $R_L$ and the power stored in the output capacitor $C_o$. Accordingly, the power stored in the output capacitor $C_o$ is calculated by a subtraction of the power $P_{out}$ consumed by the load $R_L$ from the secondary transmitted power $P_{se}$. These relationships give Formula 8 below.

[Mathematical Formula 4]

$$P_{se} - P_{out} = \frac{2}{\pi} N I_r V_o - V_o I_o = \frac{d}{dt}\left(\frac{1}{2} C_o V_o^2\right) \quad \text{Formula 8}$$

where
- $P_{se}$: induced electromotive force
- $P_{out}$: power consumed by the load
- N: turns ratio
- L: amplitude of the primary current
- $V_o$: output voltage
- $I_o$: DC component of the output current
- $C_o$: capacitance of the output capacitor Formulas 5 and 8 are rearranged using the DC component of the current flowing from the rectifier circuit to the output capacitor $C_o$ in the secondary circuit 13. Thus obtained Formulas 9 and 10 provide circuit characteristics of the resonant circuit 111 implemented as the LLC resonant converter.

[Mathematical Formula 5]

$$\frac{\pi^2}{4N} L_r \frac{dI_s}{dt} = V_{inv} \cos\theta - N V_o \quad \text{Formula 9}$$

$$C_o \frac{dV_o}{dt} = I_s - I_o \quad \text{Formula 10}$$

where
- N: turns ratio
- $L_r$: leakage inductance
- $I_s$: DC component of the secondary current flowing from the rectifier circuit to the output capacitor
- $V_{inv}$: input voltage
- $\cos\theta$: power factor
- $V_o$: output voltage
- $C_o$: capacitance of the output capacitor
- $I_o$: DC component of the output current As described above, the control system CS according to the present disclosure includes the converter 1 such as a DC/DC converter and the controller 2 for controlling the converter 1. The controller 2 controls the converter 1 by the power factor-based control.

Embodiments

The following description is directed to examples of specific embodiments for conducting the power factor control.

First Embodiment

The power factor can be represented as a ratio of the active power to the apparent power, by Formula 11 below. The first embodiment controls the power factor by controlling the active power, based on the ratio of the active power to the apparent power.

power factor=cos θ=active power/apparent power    Formula 11

Figure 3:
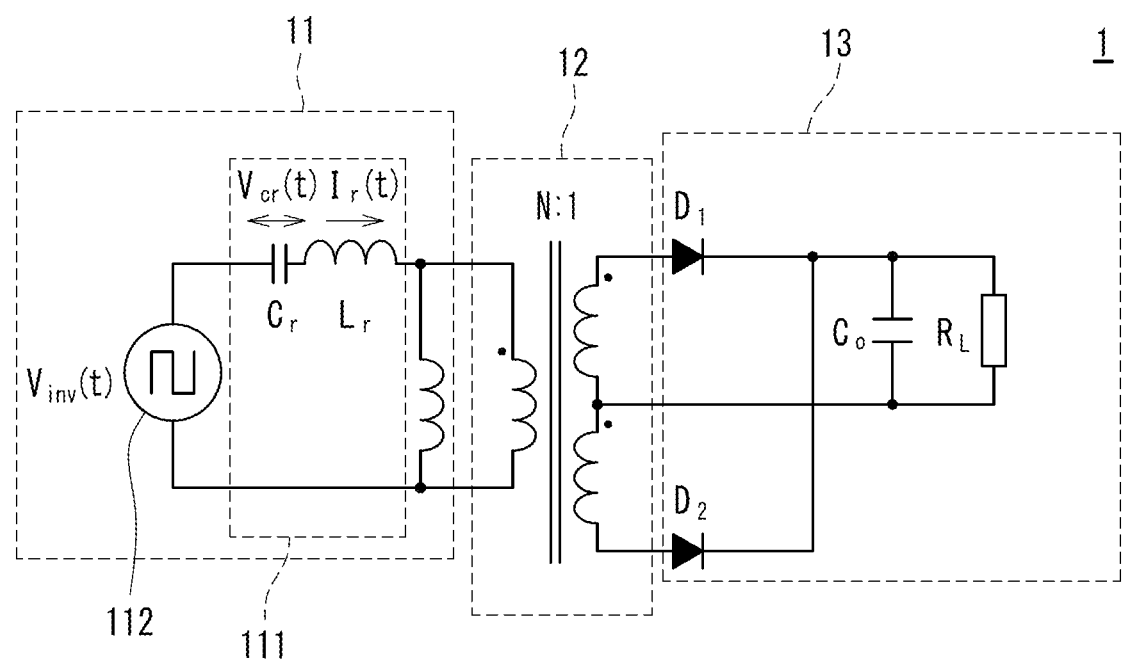
FIG. 3 is a circuit diagram showing an example of an equivalent circuit of the converter provided in the control system according to the present disclosure.
Figure 4:
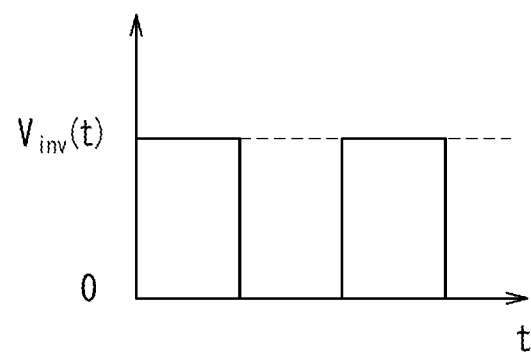
FIG. 4 is a graph showing an example of a waveform relating to the converter provided in the control system according to the present disclosure.

FIG. 3 is a circuit diagram showing an example of an equivalent circuit of the converter 1 provided in the control system CS according to the present disclosure. FIG. 4 is a graph showing an example of a waveform relating to the converter 1 provided in the control system CS according to the present disclosure. In the equivalent circuit of the converter 1 shown in FIG. 3, the square wave source 112 represents the input power source 10 and the voltage generation circuit 110. FIG. 4 shows the input voltage $V_{inv}(t)$ with its changes over time, where the horizontal axis indicates the time t and the vertical axis indicates the input voltage $V_{inv}(t)$ across the square wave source 112. The converter 1 illustrated in FIG. 3 operates in response to an input of the square wave illustrated in FIG. 4. By measuring the active power and the apparent power and implementing feedback control according to Formula 11, the converter 1 can achieve the power factor control based on power control. To simplify this power factor control, the first embodiment is configured to control the power factor by indirectly controlling the power in accordance with the voltage across the resonant capacitor $C_r$.

Figure 5:
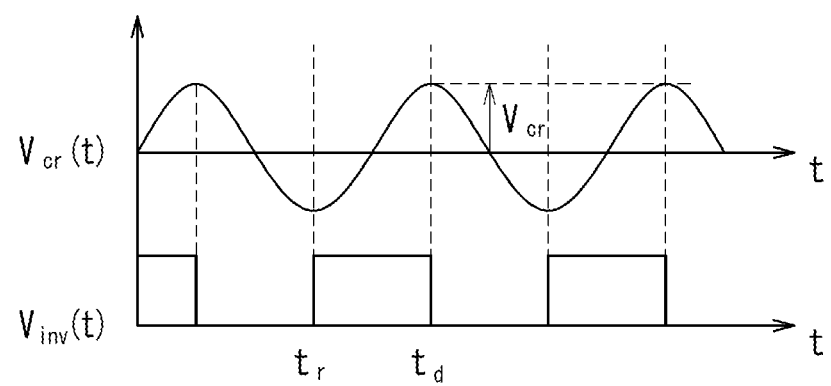
FIG. 5 is a graph showing an example of waveforms relating to the converter provided in the control system according to the present disclosure.

FIG. 5 is a graph showing an example of waveforms relating to the converter 1 provided in the control system CS according to the present disclosure. FIG. 5 shows the input voltage $V_{inv}(t)$ and the resonant capacitor voltage $V_{cr}(t)$ with their changes over time, where the horizontal axis indicates the time t and the vertical axis indicates the voltage, and where the input voltage $V_{inv}(t)$ and the resonant capacitor voltage $V_{cr}(t)$ are aligned for comparison. The resonant capacitor voltage $V_{cr}(t)$ shown in FIG. 5 represents a potential difference between electrodes of the resonant capacitor $C_r$ provided in the resonant circuit 111. The active power in the primary circuit 11 can be represented by Formula 12 below using a cycle T in the square wave source 112, the resonant capacitor voltage Vcr(t), the moment $t_r$ when the input voltage $V_{inv}$ starts rising (hereinafter, the start of rising may be referred to as "rise(s)" or "rising"), and the moment $t_d$ when the input voltage $V_{inv}$ starts dropping (hereinafter, the start of dropping may be referred to as "drop(s)" or "dropping").

$$P_u = (V_{inv}/T) \cdot [V_{cr}(t_d) - V_{cr}(t_r)] \quad \text{Formula 12}$$

where
  $P_u$: active power
  $V_{inv}$: input voltage
  T: cycle of the square wave
  $V_{cr}(t)$: resonant capacitor voltage at the moment t
  $t_r$: moment of rising
  $t_d$: moment of dropping The apparent power is equal to the active power at the power factor of 1. When the power factor is 1, the input voltage $V_{inv}$ rises at local minima of the resonant capacitor voltage and drops at local maxima thereof, as illustrated in FIG. 5. Accordingly, the apparent power can be represented by Formula 13 below using an amplitude $V_{cr}$ of the resonant capacitor voltage.

$$P_h = (V_{inv}/T) \cdot 2V_{cr} \quad \text{Formula 13}$$

where
  $P_h$: apparent power
  $V_{inv}$: input voltage
  T: cycle of the square wave
  $V_{cr}$: amplitude of the resonant capacitor voltage As indicated by Formulas 12 and 13, the active power and the apparent power can be derived from the amplitude $V_{cr}$ of the resonant capacitor voltage, the moment of rising $t_r$, and the moment of dropping $t_d$. In this case, the active power and the apparent power do not have to be detected directly, and can be detected indirectly by detection of the resonant capacitor voltage $V_{cr}$. The detected active power and apparent power are used to conduct the power factor control.

A specific example of the circuit configuration is given below. The power factor derived as the ratio of the active power to the apparent power (derived power factor) can be represented by Formula 14 below using the moment of rising $t_r$ and the moment of dropping $t_d$ of the square wave, the resonant capacitor voltage $V_{cr}(t)$, and the amplitude $V_{cr}$ of the resonant capacitor voltage.

$$\text{power factor} = P_u/P_h = [V_{cr}(t_d) - V_{cr}(t_r)]/2V_{cr} \quad \text{Formula 14}$$

where
  $P_u$: active power
  $P_h$: apparent power
  $V_{cr}(t)$: resonant capacitor voltage at the moment t
  $t_r$: moment of rising
  $t_d$: moment of dropping
  $V_{cr}$: amplitude of the resonant capacitor voltage In Formula 14, suppose that the magnitude of the resonant capacitor voltage is approximated to be equal at the moment of rising $t_r$ and at the moment of dropping $t_d$. Then, the power factor (derived power factor) can be represented by Formula 15 below.

$$\text{power factor} = P_u/P_h = [2|V_{cr}(t_r)|]/2V_{cr} = |V_{cr}(t_r)|/V_{cr} \quad \text{Formula 15}$$

where
  $P_u$: active power
  $P_h$: apparent power
  $V_{cr}(t)$: resonant capacitor voltage at the moment t
  $t_r$: moment of rising
  $V_{cr}$: amplitude of the resonant capacitor voltage The power factor obtained according to Formula 15 is the ratio of the resonant capacitor voltage $V_{cr}(t)$ at the moment t to the amplitude $V_{cr}$ of the resonant capacitor voltage. As a result, the controller 2 implements the voltage generation circuit 110 that sets the capacitor voltage at the moment of rising $t_r$, based on the amplitude $V_{cr}$ of the resonant capacitor voltage, and that outputs switching signals to the gate terminals of the switching elements Q1, Q2 when the capacitor voltage reaches the set capacitor voltage. This configuration enables the controller 2 to control the power factor by the power control. The voltage generation circuit 110 implemented in the controller 2 needs a function of acquiring the amplitude $V_{cr}$ of the resonant capacitor voltage. By acquiring the amplitude $V_{cr}$ of the resonant capacitor voltage, the controller 2 can derive a control target resonant capacitor voltage that is necessary to achieve the control target power factor that is a desired value for control. The controller 2 further needs a function of outputting the switching signals when the capacitor voltage reaches the control target resonant capacitor voltage.

Figure 6:
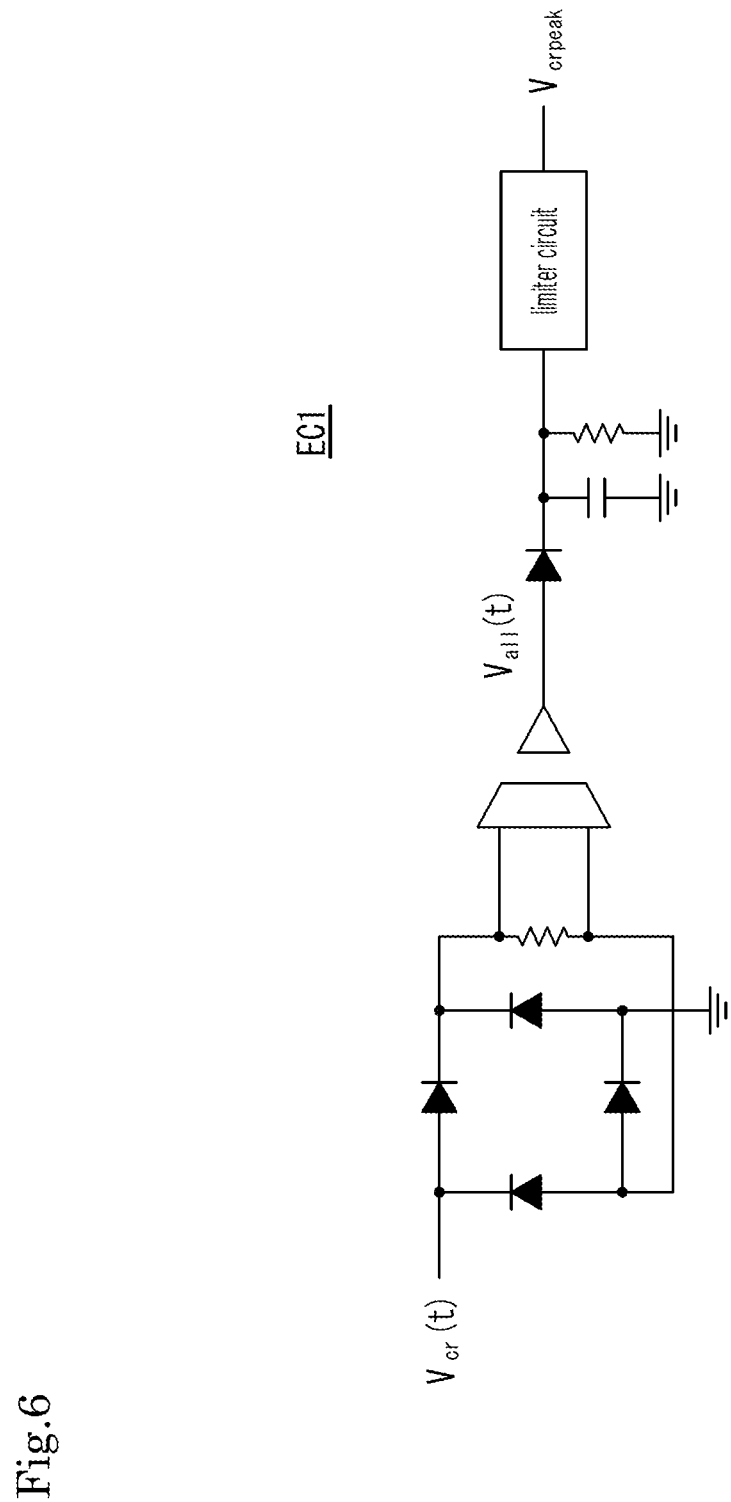
FIG. 6 is a circuit diagram showing a circuit example implementable in a controller provided in the control system according to the present disclosure.

FIG. 6 is a circuit diagram showing a circuit example implementable in the controller 2 provided in the control system CS according to the present disclosure. FIG. 6 illustrates an example of an amplitude acquisition circuit EC1 that acquires the amplitude of the resonant capacitor voltage. The amplitude acquisition circuit EC1 acquires the resonant capacitor voltage $V_{cr}(t)$ from the resonant capacitor $C_r$ provided in the converter 1, and detects a maximum value (local maximum) $V_{crpeak}$ of the resonant capacitor voltage with the DC component removed. The amplitude acquisition circuit EC1 is composed of various circuits and components including a rectifier circuit for performing full-wave rectification of the acquired resonant capacitor voltage $V_{cr}(t)$, a voltage sensor for detecting a full-wave rectified resonant capacitor voltage $V_{all}(t)$, and a detector circuit and a limiter circuit for detecting a maximum value $V_{crpeak}$ of the detected full-wave rectified resonant capacitor voltage $V_{all}(t)$ and outputting the maximum value $V_{crpeak}$. The thus configured amplitude acquisition circuit EC1 can acquire the amplitude of the resonant capacitor voltage by obtaining the absolute value of the maximum resonant capacitor voltage $V_{crpeak}$ that is output from the detector circuit. The example illustrated in FIG. 6 uses a diode detector circuit including a diode, a capacitor, and a resistance. Owing to the full-wave rectification in the rectifier circuit, the amplitude acquisition circuit EC1 can acquire the amplitude of the resonant capacitor voltage from both the positive resonant capacitor voltage and the negative resonant capacitor voltage, and is hence expected to improve immediate responsiveness.

Figure 7:
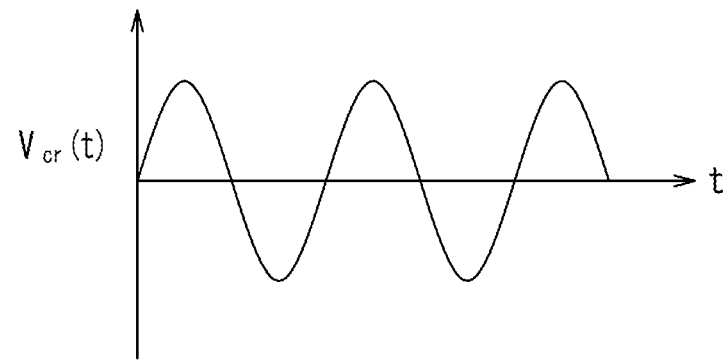
FIG. 7 is a graph showing an example of a waveform relating to the controller provided in the control system according to the present disclosure.
Figure 8:
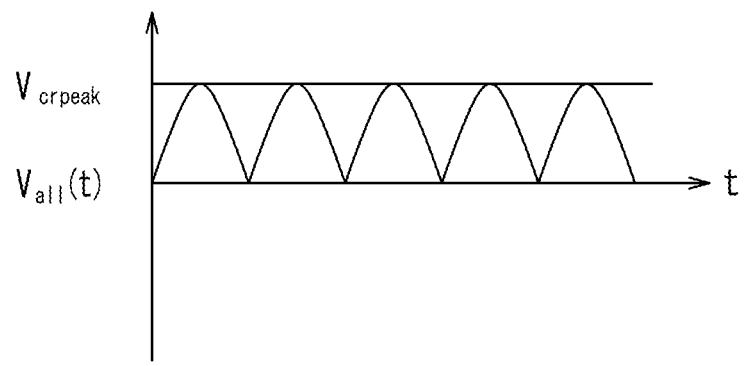
FIG. 8 is a graph showing an example of a waveform relating to the controller provided in the control system according to the present disclosure.

FIGS. 7 and 8 are graphs showing waveform examples relating to the controller 2 provided in the control system CS according to the present disclosure. FIG. 7 shows the resonant capacitor voltage with its changes over time, where the horizontal axis indicates the time t and the vertical axis indicates the resonant capacitor voltage $V_{cr}(t)$. FIG. 8 shows the resonant capacitor voltage and its maximum value with their changes over time, where the horizontal axis indicates the time t and the vertical axis indicates the full-wave rectified resonant capacitor voltage $V_{all}(t)$ that changes over time and the absolute value of the maximum resonant capacitor voltage $V_{crpeak}$ that is output from the detector circuit. As illustrated in FIG. 7, the amplitude acquisition circuit EC1 acquires the resonant capacitor voltage from the converter 1 as a sinusoidal wave. Then, the amplitude acquisition circuit EC1 subjects the sinusoidal resonant capacitor voltage to full-wave rectification, and outputs a maximum value (local maximum) of the full-wave rectified resonant capacitor voltage as the amplitude, as illustrated in FIG. 8. In the manner described above, the amplitude acquisition circuit EC1 outputs the amplitude $V_{cr}$ of the resonant capacitor voltage, based on the resonant capacitor voltage.

Figure 9:
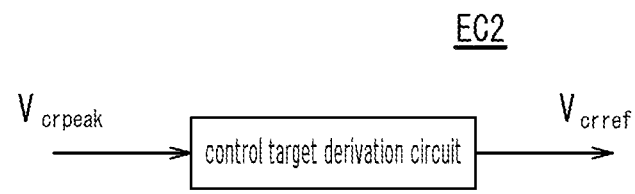
FIG. 9 is a block diagram showing a circuit example implementable in the controller provided in the control system according to the present disclosure.

FIG. 9 is a block diagram showing a circuit example implementable in the controller 2 provided in the control system CS according to the present disclosure. The block diagram of FIG. 9 conceptually illustrates a control target derivation circuit EC2 that derives and outputs the control target resonant capacitor voltage. The control target derivation circuit EC2 compares the maximum resonant capacitor voltage $V_{crpeak}$ with the control target resonant capacitor voltage and, from a result of the comparison, derives the control target resonant capacitor voltage $V_{crref}$ that is a desired value for control. As descried above, the absolute value of the maximum resonant capacitor voltage $V_{crpeak}$ is obtained in the amplitude acquisition circuit EC1. The control target resonant capacitor voltage $V_{crref}$ may be set in advance or may be derived from the control target voltage that is based on the output voltage $V_o$ from the secondary circuit 13. For example, the control target resonant capacitor voltage $V_{crref}$ is derived from the amplitude of the resonant capacitor voltage and from the control target voltage derived as a voltage corresponding to the control target power factor.

Figure 10:
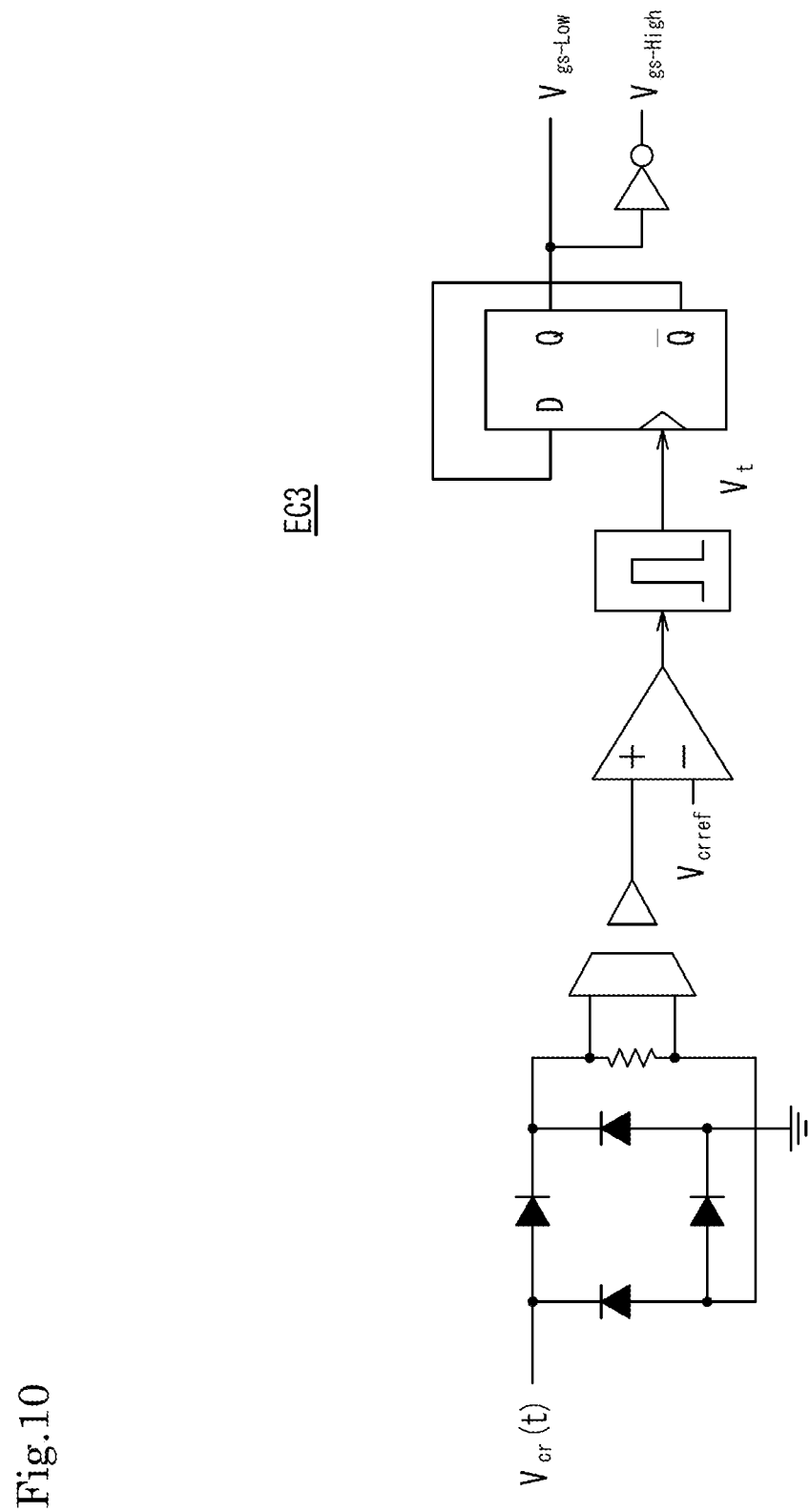
FIG. 10 is a circuit diagram showing a circuit example implementable in the controller provided in the control system according to the present disclosure.

FIG. 10 is a circuit diagram showing a circuit example implementable in the controller 2 provided in the control system CS according to the present disclosure. FIG. 10 illustrates an example of a switching signal output circuit EC3 that outputs switching signals $V_{gs-High}$, $V_{gs-Low}$, based on the resonant capacitor voltage $V_{cr}(t)$ and the control target resonant capacitor voltage $V_{crref}$. The switching signal output circuit EC3 is composed of various circuits and components including a rectifier circuit, a voltage sensor, a comparator, a pulse generator, and a D flip-flop. The rectifier circuit and the voltage sensor are shared with the amplitude acquisition circuit EC1. The comparator compares the absolute value of the resonant capacitor voltage $V_{cr}(t)$ that is output from the voltage sensor, with the control target resonant capacitor voltage $V_{crref}$. The comparator then outputs a high-level signal or a low-level signal to the pulse generator. Specifically, when the absolute value of the resonant capacitor voltage $V_{cr}(t)$ exceeds the control target resonant capacitor voltage $V_{crref}$, the comparator changes the level of the output signal to the pulse generator from low to high. At the moment when the level of the signal from the comparator changes from low to high, the pulse generator outputs a pulse, as a rising signal, to the D flip-flop. Every time the resonant capacitor voltage $V_{cr}$ reaches the control target, the thus configured switching signal output circuit EC3 outputs the switching signals $V_{gs-High}$, $V_{gs-Low}$ to invert the voltage generation circuit 110.

Figure 11:
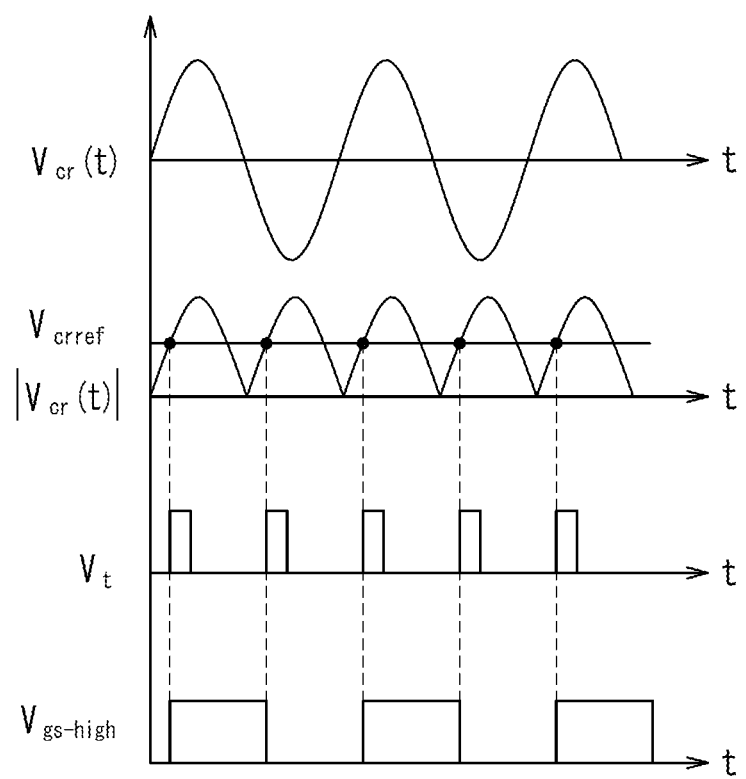
FIG. 11 is a graph showing an example of waveforms relating to the controller provided in the control system according to the present disclosure.

FIG. 11 is a graph showing an example of waveforms relating to the controller 2 provided in the control system CS according to the present disclosure. FIG. 11 shows the resonant capacitor voltage $V_{cr}(t)$, the absolute value of the full-wave rectified resonant capacitor voltage $|V_{cr}(t)|$, the control target resonant capacitor voltage $V_{crref}$, the rising signal $V_r$, and the switching signal $V_{gs-High}$, with their changes over time. In the graph, the horizontal axis indicates the time t, and the vertical axis indicates the above-mentioned value, voltages, and signals. As shown by the graph in FIG. 11, an output of the rising signal $V_r$ and an inversion of the voltage generation circuit 110 occur when the absolute value of the resonant capacitor voltage $|V_{cr}(t)|$ reaches the control target resonant capacitor voltage $V_{crref}$. As also shown by the graph in FIG. 11, the level of the switching signal $V_{gs-High}$ that is output to the first switching element Q1 is changed to high at the moment when the voltage generation circuit 110 is inverted.

Figure 12:
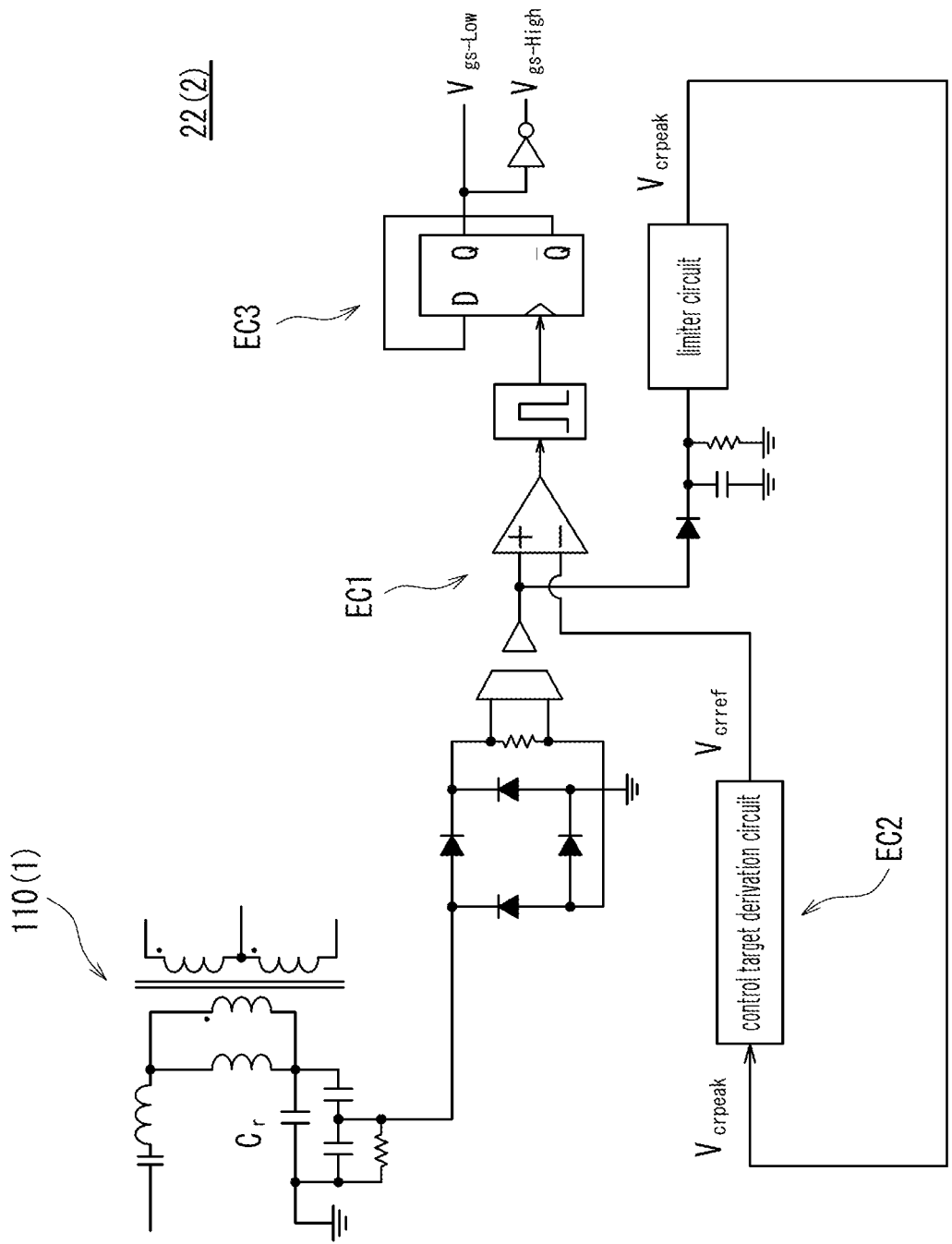
FIG. 12 is a circuit diagram showing a circuit example implementable in the controller provided in the control system according to the present disclosure.

FIG. 12 is a circuit diagram showing a circuit example implementable in the controller 2 provided in the control system CS according to the present disclosure. The example shown in FIG. 12 is a combination of the amplitude acquisition circuit EC1, the control target derivation circuit EC2, and the switching signal output circuit EC3. The circuits illustrated in FIG. 12 are connected to the resonant capacitor $C_r$ in the voltage generation circuit 110 provided in the converter 1. The amplitude acquisition circuit EC1, the control target derivation circuit EC2, and the switching signal output circuit EC3 illustrated in FIG. 12 are incorporated in the control signal output circuit 22 for controlling the voltage generation circuit, and thus implemented in the controller 2.

The amplitude acquisition circuit EC1 and the switching signal output circuit EC3 share the rectifier circuit and the voltage sensor. The rectifier circuit is connected to the resonant capacitor $C_r$ in the voltage generation circuit 110 and detects the voltage across the resonant capacitor $C_r$. A voltage for the circuits illustrated in FIG. 12 is supplied from detection capacitors that are connected in parallel with the resonant capacitor $C_r$. The detection capacitors are composed of two series-connected capacitors and configured to detect a divided resonant capacitor voltage. Voltage division of the resonant capacitor voltage can remove the DC component contained in the resonant capacitor voltage and can also reduce the voltage to be detected.

The amplitude acquisition circuit EC1 receives an input of the resonant capacitor voltage, and outputs the amplitude $V_{crpeak}$ of the resonant capacitor voltage to the control target derivation circuit EC2. The control target derivation circuit EC2 receives an input of the amplitude $V_{crpeak}$ of the resonant capacitor voltage, and outputs the control target resonant capacitor voltage $V_{crref}$ to the switching signal output circuit EC3. The switching signal output circuit EC3 receives inputs of the resonant capacitor voltage and the control target resonant capacitor voltage $V_{crref}$, and outputs the switching signals $V_{gs-High}$, $V_{gs-Low}$ to the voltage generation circuit 110.

In the manner described above, the control system CS according to the first embodiment controls the power of the converter 1, and thereby achieves the power factor control based on the power control.

<Simulation Results>

To compare the performance, the above-described power factor control and the conventional frequency control were applied to the control system CS according to the present disclosure. The power factor control corresponds to the application example of the control method according to the present disclosure. The method for the power factor control was based on the power control described in the first embodiment. In both of the power factor control and the frequency control, the same converter 1 was used under the following conditions.

Figure 13:
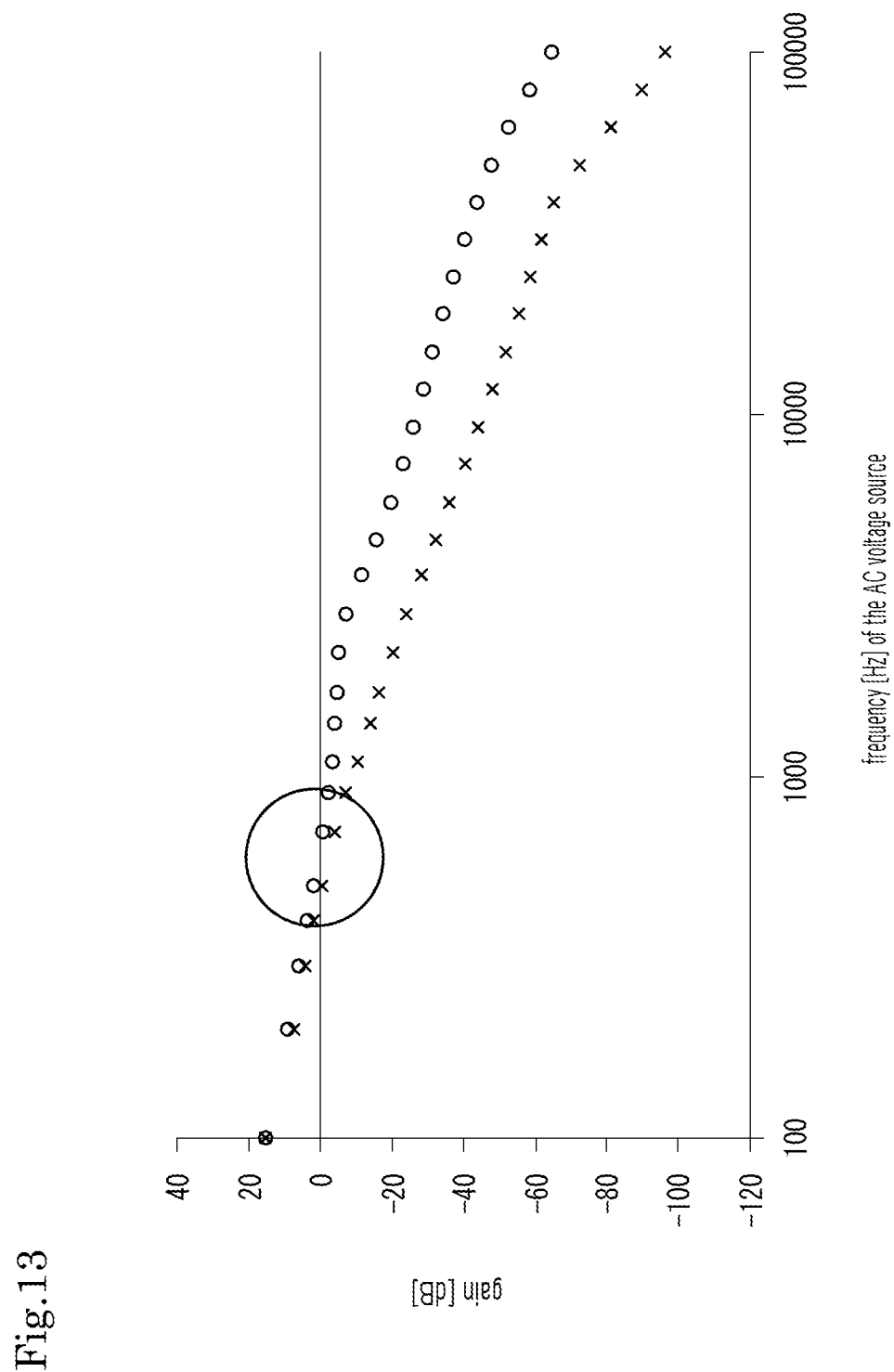
FIG. 13 is a graph showing an example of simulation conditions for the control system according to the present disclosure.

Input voltage: 100 [V] AC, to be rectified into DC
Resonant capacitor: 125 [nF]
Leakage inductance in the primary circuit: 20 [uH]
Magnetizing inductance: 40 [uH]
Leakage inductance in the secondary circuit: 0.0001 [nH]
Turns ratio: 2:1:1
Output capacitor: 12.5 [uF]
Output voltage: 12.5 [V] DC FIG. 13 a graph showing an example of simulation conditions for the control system CS according to the present disclosure. FIG. 13 shows the first order transfer functions for the power factor control and the frequency control, where the horizontal axis indicates the frequency [Hz] of the AC voltage source and the vertical axis indicates the gain [dB]. In this graph, the symbol "○" represents the first order transfer function for the power factor control, and the symbol "×" represents the first order transfer function for the frequency control. As a condition for the comparative experiment between the power factor control and the frequency control, the respective crossover frequencies (circled in the graph of FIG. 13) were matched substantially so as to avoid a difference in control response speed.

Figure 14:
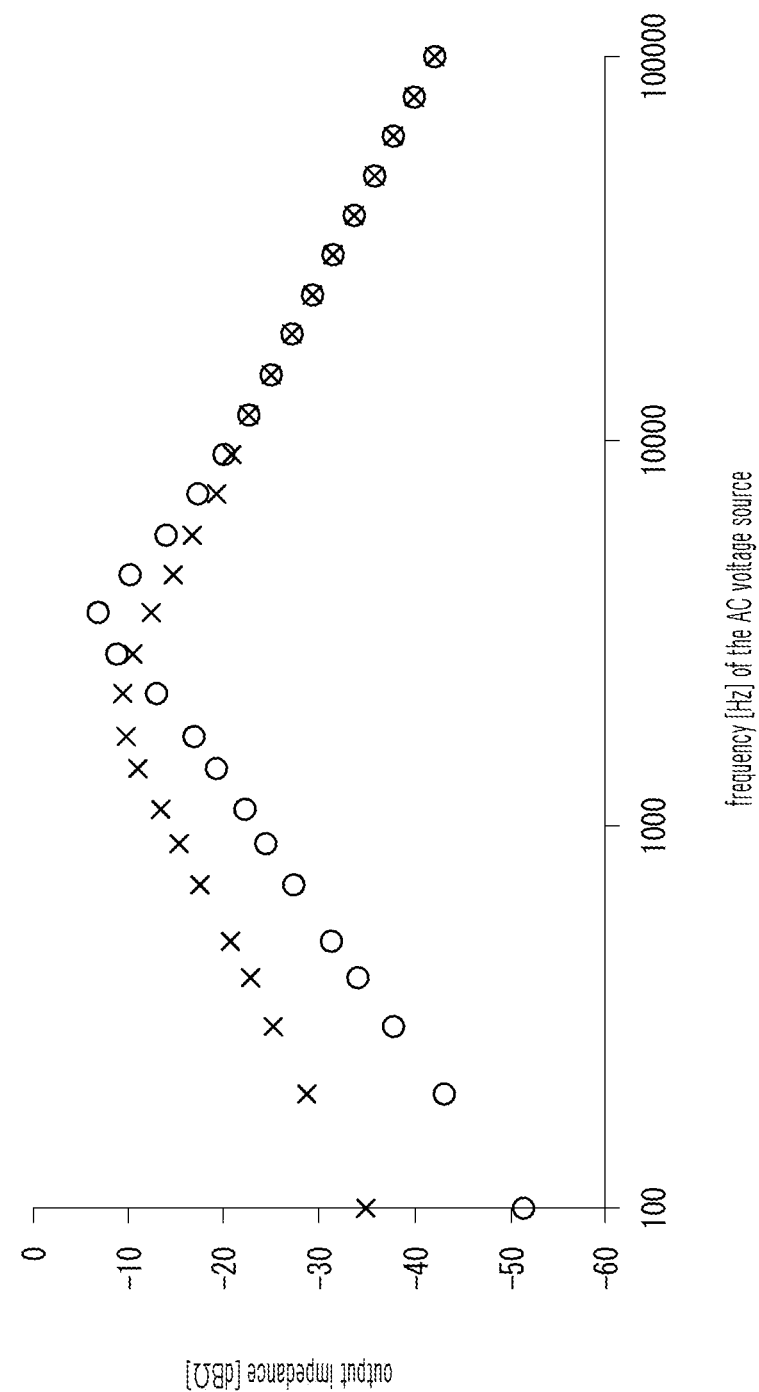
FIG. 14 is a graph showing an example of simulation results in the control system according to the present disclosure.
Figure 15:
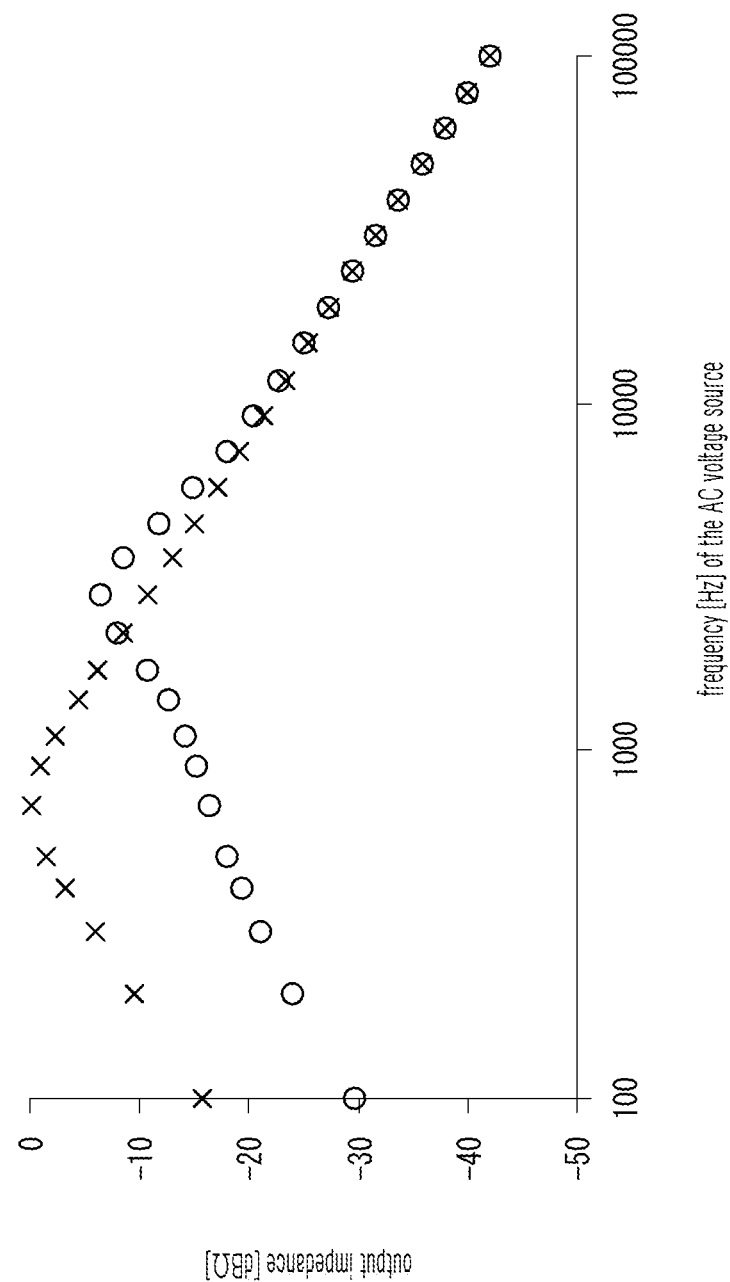
FIG. 15 is a graph showing an example of simulation results in the control system according to the present disclosure.
Figure 16:
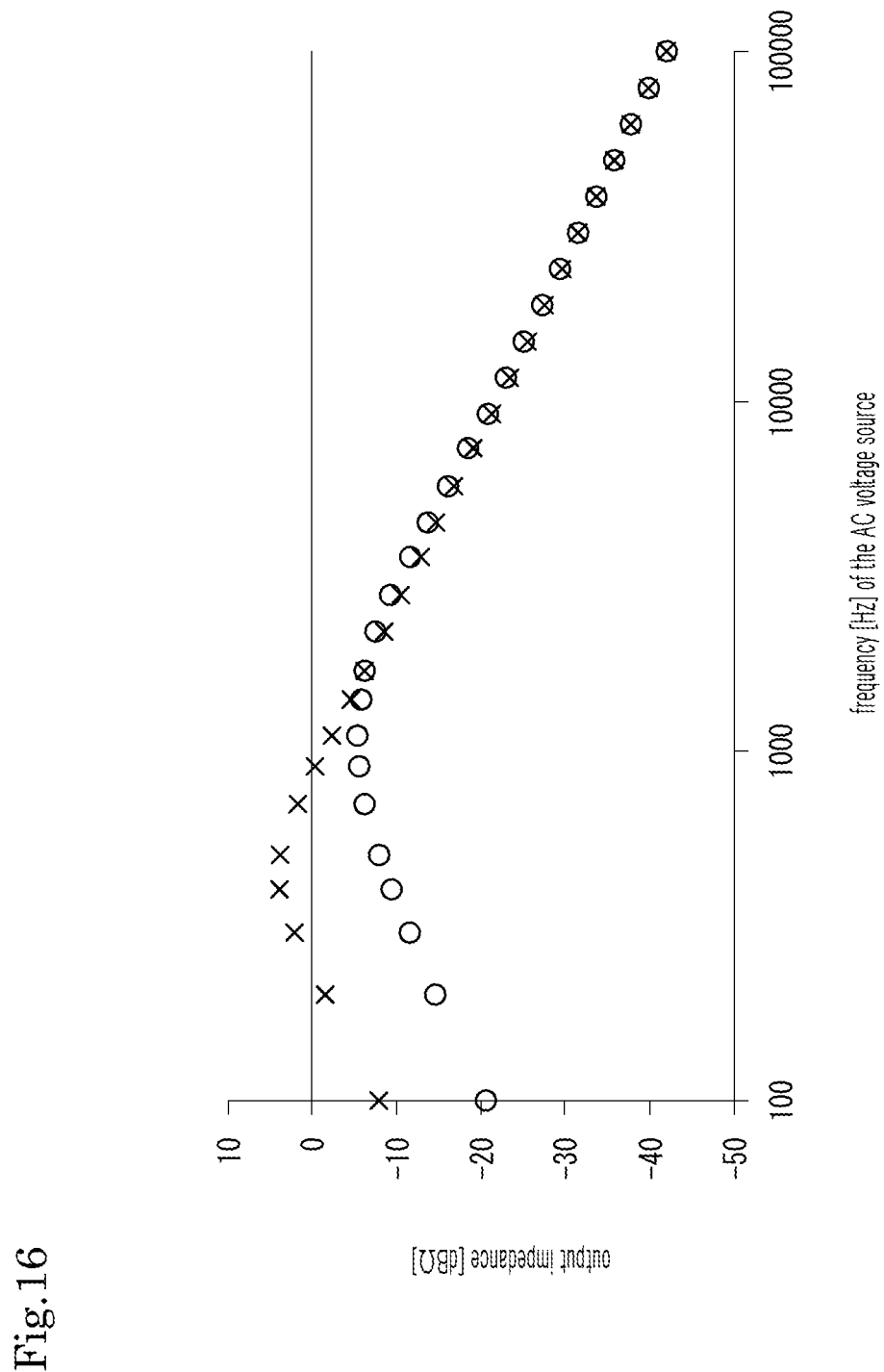
FIG. 16 is a graph showing an example of simulation results in the control system according to the present disclosure.

FIGS. 14 to 16 are graphs showing examples of simulation results in the control system CS according to the present disclosure. FIGS. 14 to 16 show frequency characteristics with respect to the load $R_L$ under the power factor control and the frequency control, where the horizontal axis indicates the frequency [Hz] of the AC current source and the vertical axis indicates the output impedance [dBΩ]. FIGS. 14, 15, and 16 show frequency characteristics with the loads $R_L$ of 0.5 [Ω], 2.0 [Ω], and 4.0 [Ω], respectively. In these graphs, the symbol "○" represents frequency characteristics of the output impedance under the power factor control, and the symbol "×" represents frequency characteristics of the output impedance under the frequency control. As shown in FIGS. 14 to 16, the power factor control can keep lower output impedances for all types of loads $R_L$, particularly in the low-frequency band.

Figure 17:
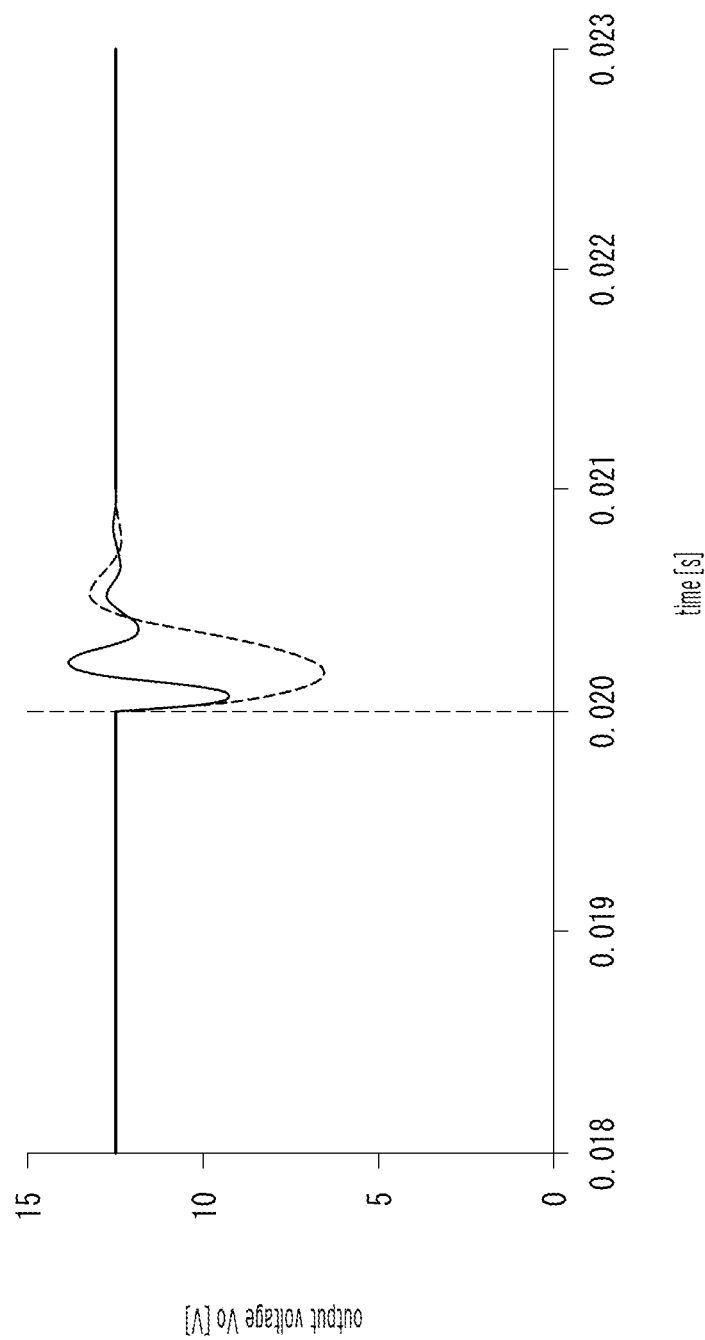
FIG. 17 is a graph showing an example of simulation results in the control system according to the present disclosure.
Figure 18:
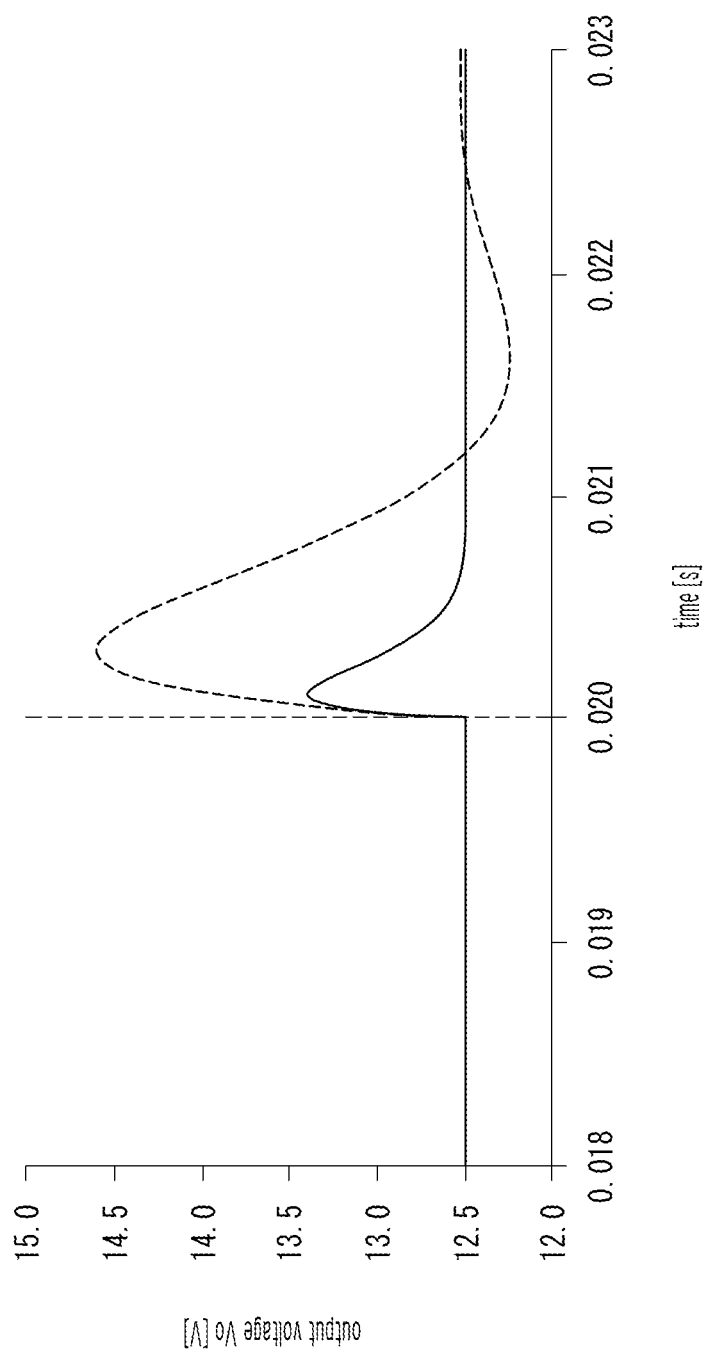
FIG. 18 is a graph showing an example of simulation results in the control system according to the present disclosure.

FIGS. 17 and 18 are graphs showing examples of simulation results in the control system CS according to the present disclosure. FIGS. 17 and 18 show responsiveness to the load $R_L$ under the power factor control and the frequency control, where the horizontal axis indicates the time [s] and the vertical axis indicates the output voltage $V_o$ [V]. FIG. 17 shows responsiveness when the load $R_L$ changed stepwise from 2 [Ω] to 0.5 [Ω] at 0.020 [s]. FIG. 18 shows responsiveness when the load $R_L$ changed stepwise from 2 [Ω] to 4 [Ω] at 0.020 [s]. In each graph, the solid line represents the output voltage $V_o$ that changed over time under the power factor control, and the dashed line represents the output voltage $V_o$ that changed over time under the frequency control. As shown in FIGS. 17 and 18, the power factor control responded more quickly to the load changes, both the increase and decrease in the load, than the frequency control.

Second Embodiment

The power factor can be represented as a phase difference between the amplitude of the input voltage in the primary circuit (primary voltage) and the amplitude of the primary current. The second embodiment controls the power factor by controlling the phase difference.

A method for the power factor control based on the phase difference control involves measuring the phase of an input current as a reference phase, obtaining a phase difference between the measured reference phase and a phase of a voltage generated by the voltage generation circuit 110, and implementing feedback control of the converter 1 based on the phase difference. To control the converter 1 by the voltage generation circuit control signals that are output from the controller 2, the second embodiment is configured to control the power factor by controlling a time from the reference phase of the primary current until the moment when the input voltage starts rising, and thereby indirectly controlling the phase.

The power factor control based on the phase control can be implemented, for example, by acquiring a reference phase, acquiring a time elapsed from the reference phase, and outputting voltage generation circuit control signals based on the reference phase and the elapsed time.

Ideally, the reference phase necessary for the phase difference control is acquired by detection of an electric current by a current sensor. However, the current sensor, due to its significant delay, is unsuitable to control an LLC converter operated at high frequencies. In the second embodiment, the control system CS acquires the reference phase by detecting a phase of the resonant capacitor voltage that is obtained as an integral of the primary current.

Figure 19:
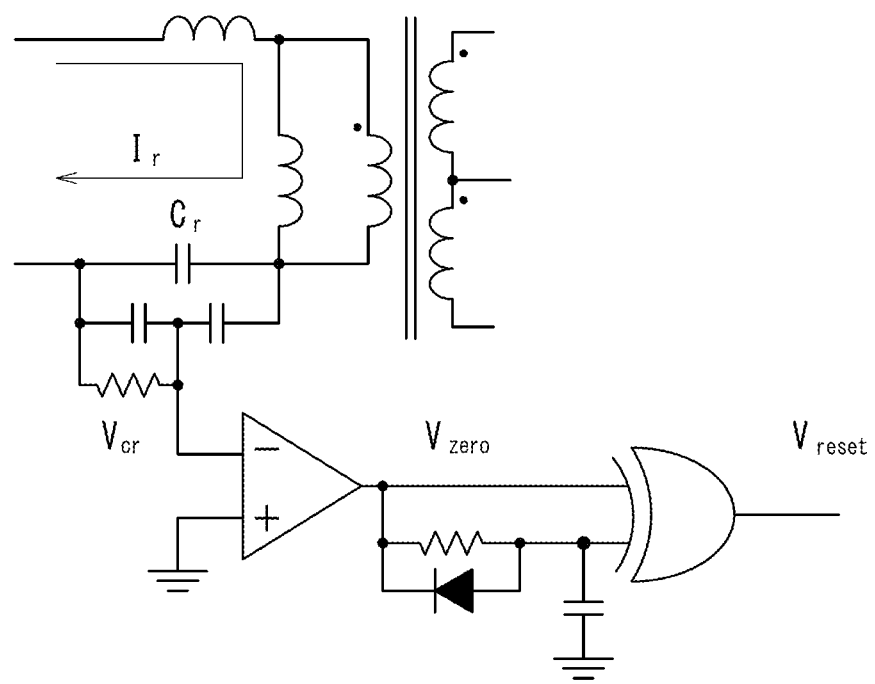
FIG. 19 is a circuit diagram showing a circuit example implementable in the controller provided in the control system according to the present disclosure.

FIG. 19 is a circuit diagram showing a circuit example implementable in the controller 2 provided in the control system CS according to the present disclosure. FIG. 19 shows an example of a reference phase acquisition circuit EC4 that acquires a reference phase. The reference phase acquisition circuit EC4 includes a comparator that acquires the resonant capacitor voltage $V_{cr}$ from the resonant capacitor $C_r$ provided in the converter 1 and that compares the acquired resonant capacitor voltage $V_{cr}$ with a ground potential. The circuit illustrated in FIG. 19 acquires the resonant capacitor voltage $V_{cr}$ as a divided voltage. Based on the comparison between the resonant capacitor voltage $V_{cr}$ and the ground potential, the comparator outputs a high-level or low-level polar signal $V_{zero}$ to a modulator circuit. Specifically, when the resonant capacitor voltage $V_{cr}$ is higher than the ground potential (i.e., positive), the comparator outputs a low-level polar signal $V_{zero}$ when the resonant capacitor voltage $V_{cr}$ is lower than the ground potential (i.e., negative), the comparator outputs a high-level polar signal $V_{zero}$. The modulator circuit is configured using an XOR circuit. The modulator circuit modulates the pulse width of a pulse that is output as the polar signal $V_{zero}$ that inverts between high-level and low-level, and outputs the modulated pulse as a reference phase signal $V_{reset}$. Specifically, as the reference phase signal $V_{reset}$, the modulator circuit outputs a pulse that indicates the moment when the level of the polar signal $V_{zero}$ changes from low to high.

Figure 20:
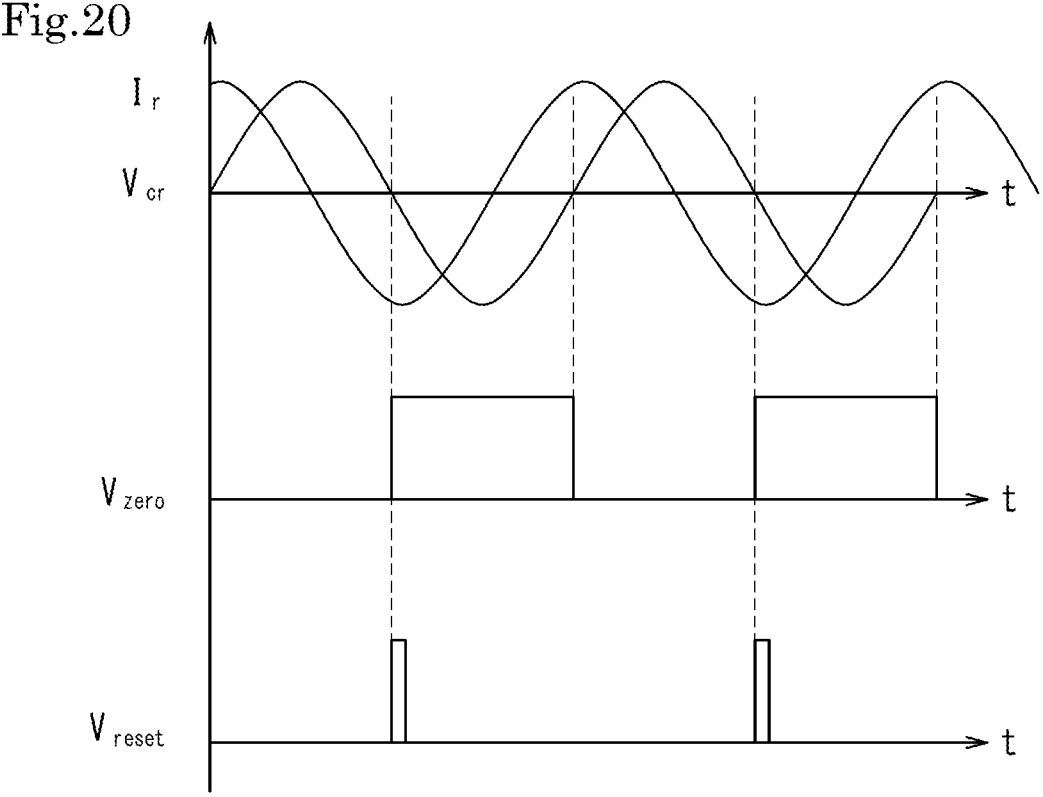
FIG. 20 is a graph showing an example of waveforms relating to the controller provided in the control system according to the present disclosure.

FIG. 20 is a graph showing an example of waveforms relating to the controller 2 provided in the control system CS according to the present disclosure. FIG. 20 shows the primary current $I_r$, the resonant capacitor voltage $V_{cr}$, the polar signal $V_{zero}$, and the reference phase signal $V_{reset}$ with their changes over time. In the graph, the horizontal axis indicates the time t, and the vertical axis indicates the above-mentioned current, voltage, and signals. As shown by the graph in FIG. 20, the comparator outputs the polar signal $V_{zero}$ that is a pulse inverted according to the polarity of the resonant capacitor voltage $V_{cr}$. As also illustrated in FIG. 20, the moment when the pulse rises from low-level to high-level corresponds to the moment when the resonant capacitor voltage $V_{cr}$ is inverted from positive to negative. The modulator circuit outputs the pulse-width-modulated reference phase signal $V_{reset}$ at the moment when the pulse for the polar signal $V_{zero}$ is inverted from low-level to high-level. The reference phase signal $V_{reset}$ is always output at the moment when the resonant capacitor voltage $V_{cr}$ is inverted from positive to negative, which means that the reference phase signal $V_{reset}$ is always output at the same phase of the primary current $I_r$. In other words, the reference phase signal $V_{reset}$ serves as a reference phase acquisition signal.

Figure 21:
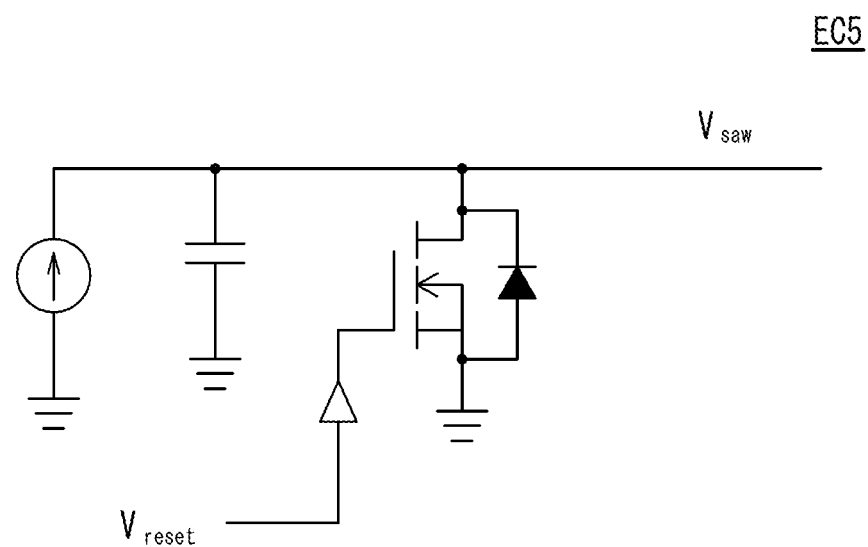
FIG. 21 is a circuit diagram showing a circuit example implementable in the controller provided in the control system according to the present disclosure.

FIG. 21 is a circuit diagram showing a circuit example implementable in the controller 2 provided in the control system CS according to the present disclosure. FIG. 21 shows an example of a waveform generation circuit EC5 that generates a time-varying waveform that changes over time. The waveform generation circuit EC5 can acquire a time elapsed from the reference phase, from this time-varying waveform. As the time-varying waveform, the waveform generation circuit EC5 generates a sawtooth wave in which the voltage varies along a uniform slope relative to the time in a given time period. From the voltage of the sawtooth wave generated as the time-varying waveform, the waveform generation circuit EC5 can acquire the elapsed time. The waveform generation circuit EC5 illustrated in FIG. 21 includes a reset circuit using a charging power source, a charging capacitor, and a MOSFET. While the charging capacitor is charged by the charging power source, a voltage across the charging capacitor rises proportionately to the elapsed time. When the reference phase signal $V_{reset}$ is input to the gate terminal of the reset circuit, the charging capacitor discharges. As a result, the waveform of the voltage across the charging capacitor is a sawtooth wave that rises along a uniform slope relative to the time elapsed from the input of the reference phase signal $V_{reset}$. The waveform generation circuit EC5 thus generates the time-varying sawtooth wave, and outputs a sawtooth wave voltage $V_{saw}$ based on the generated sawtooth wave. Note that the waveform generated by the waveform generation circuit EC5 is not limited to the sawtooth wave, and may be any waveform that changes with time.

Figure 22:
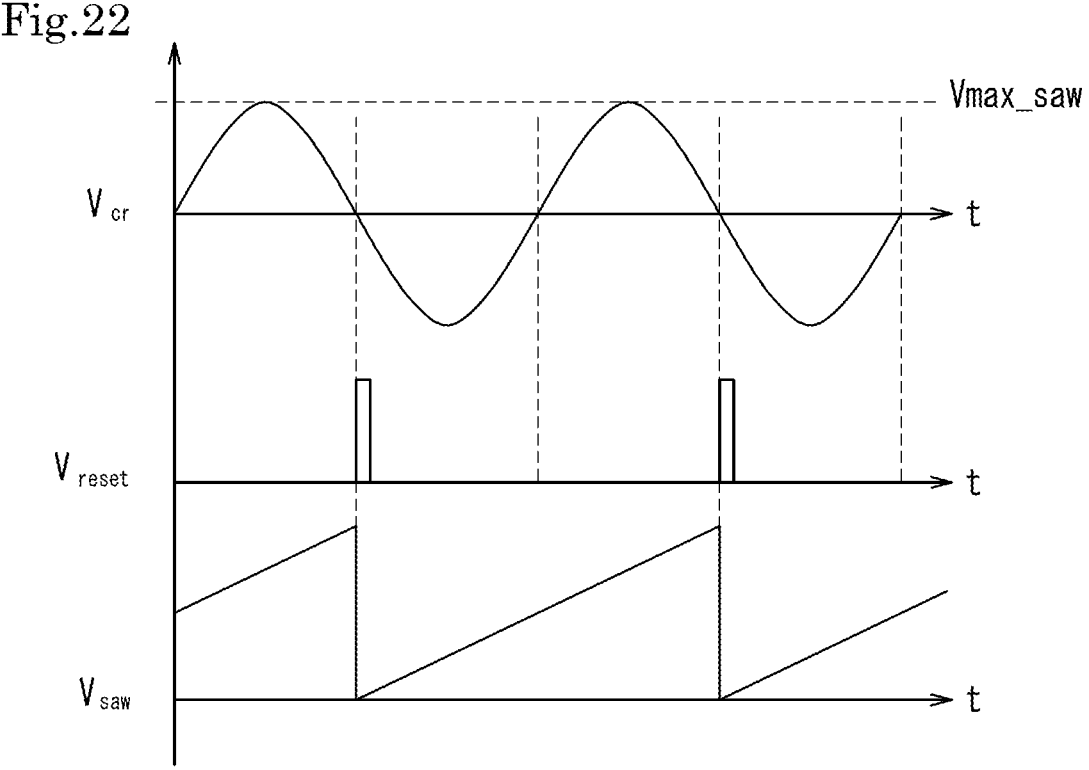
FIG. 22 is a graph showing an example of waveforms relating to the controller provided in the control system according to the present disclosure.
Figure 23:
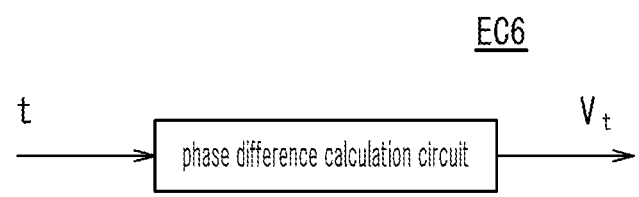
FIG. 23 is a block diagram showing a circuit example implementable in the controller provided in the control system according to the present disclosure.

FIG. 22 is a graph showing an example of waveforms relating to the controller 2 provided in the control system CS according to the present disclosure. FIG. 22 shows the resonant capacitor voltage $V_{cr}$, the reference phase signal $V_{reset}$, and the sawtooth wave voltage $V_{saw}$, with their changes over time. In the graph, the horizontal axis indicates the time t, and the vertical axis indicates the above-mentioned signal and voltages. As shown in FIG. 22, the waveform generation circuit EC5 receives an input of the reference phase signal $V_{reset}$, every time the resonant capacitor voltage $V_{cr}$ is inverted from positive to negative. In a time period after the input of the reference phase signal $V_{reset}$ until an input of a next reference phase signal $V_{reset}$, the waveform generation circuit EC5 outputs the sawtooth wave voltage $V_{saw}$ that increases proportionately to the elapsed time, as represented by the Formula 16 below. Eventually, the waveform generation circuit EC5 can output the elapsed time t from the reference phase, in the form of the sawtooth wave voltage $V_{saw}$.

$$V_{saw} = kt \qquad \text{Formula 16}$$

where
$V_{saw}$: voltage of the sawtooth wave
k: slope of the sawtooth wave
t: time elapsed from the reference phase FIG. 23 is a block diagram showing a circuit example implementable in the controller 2 provided in the control system CS according to the present disclosure. The block diagram of FIG. 23 shows an example of a phase difference calculation circuit EC6 provided in the controller 2. The phase difference calculation circuit EC6 receives a desired phase difference and outputs a direct current at a voltage value in proportion to the phase difference. To be specific, the phase difference calculation circuit EC6 receives an input of the desired phase difference (target phase difference θ), and outputs a target phase difference voltage $V_t$ that is a DC voltage corresponding to the target phase difference θ. In other words, the phase difference calculation circuit EC6 outputs a target value corresponding to the target phase difference θ. The target phase difference θ is converted to the target phase difference voltage $V_t$ according to Formula 17 below. The target phase difference θ may be set in advance or may be derived from the phase difference that is a desired value for control and that is derived from the output voltage $V_o$ supplied from the secondary circuit 13. For implementation, the target phase difference θ may be substituted with the elapsed time t from the reference phase, as described later. This is why the input is represented by "t" in FIG. 23.

$$V_t = V_{max\_saw} \times (\theta / 2\pi) k \qquad \text{Formula 17}$$

where
$V_t$: target phase difference voltage
$V_{max\_saw}$: maximum voltage value of the sawtooth wave voltage
θ: target phase difference θ (phase difference from the reference phase)

Figure 24:
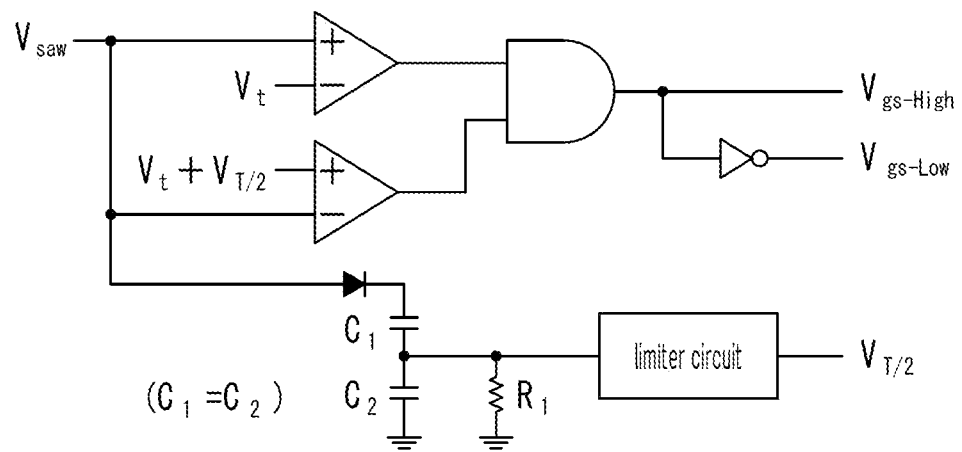
FIG. 24 is a circuit diagram showing a circuit example implementable in the controller provided in the control system according to the present disclosure.

FIG. 24 is a circuit diagram showing a circuit example implementable in the controller 2 provided in the control system CS according to the present disclosure. FIG. 24 illustrates an example of a switching signal output circuit EC7 that outputs switching signals $V_{gs-High}$, $V_{gs-Low}$, based on the sawtooth wave voltage $V_{saw}$ and the target phase difference θ. The switching signal output circuit EC7 is composed of various circuits and components including a first comparator, a second comparator, an AND gate, a NOT gate, and a T/2 generation circuit. The first comparator compares the sawtooth wave voltage $V_{saw}$ that is output from the waveform generation circuit EC5, with the target phase difference voltage $V_t$ that is output from the phase difference calculation circuit EC6. The first comparator then outputs a high-level signal or a low-level signal to the AND gate. Specifically, when the sawtooth wave voltage $V_{saw}$ exceeds the target phase difference voltage $V_t$, the first comparator changes the level of the output signal to the AND gate from low to high. In other words, the first comparator outputs a high-level signal after a predetermined elapsed time t has passed from the reference phase. The T/2 generation circuit outputs a T/2 voltage $V_{T/2}$, which corresponds to a half of the maximum value of the sawtooth wave voltage $V_{saw}$. The voltage $V_{T/2}$ corresponding to a half of the maximum value of the sawtooth wave voltage $V_{saw}$ serves as a replacement value for a half-cycle time of the primary current $I_r$. The second comparator compares the sum of the target phase difference voltage $V_t$ and the T/2 voltage $V_{T/2}$ with the sawtooth wave voltage $V_{saw}$. When the sawtooth wave voltage $V_{saw}$ exceeds the sum of the target phase difference voltage $V_t$ and the T/2 voltage $V_{T/2}$, the second comparator changes the level of the output signal to the AND gate from high to low. In other words, the second comparator outputs a low-level signal to the AND gate after a half cycle has passed since the output signal from the first comparator was changed to the high-level signal. This configuration ensures a half-cycle time difference after the level of the signal from the first comparator was changed to high until the level of the signal from the second comparator is changed to low. The half-cycle time difference allows the AND gate to output pulses with a 50% duty cycle. The AND gate outputs a switching signal $V_{gs-High}$ to the gate terminal of the first switching element Q1, and outputs a switching signal $V_{gs-Low}$ to the gate terminal of the second switching element Q2. The switching signal $V_{gs-High}$ represents a logical conjunction of the input signals from the first and second comparators. The switching signal $V_{gs-Low}$ is an inversion of the switching signal $V_{gs-High}$ that represents the logical conjunction.

Figure 25:
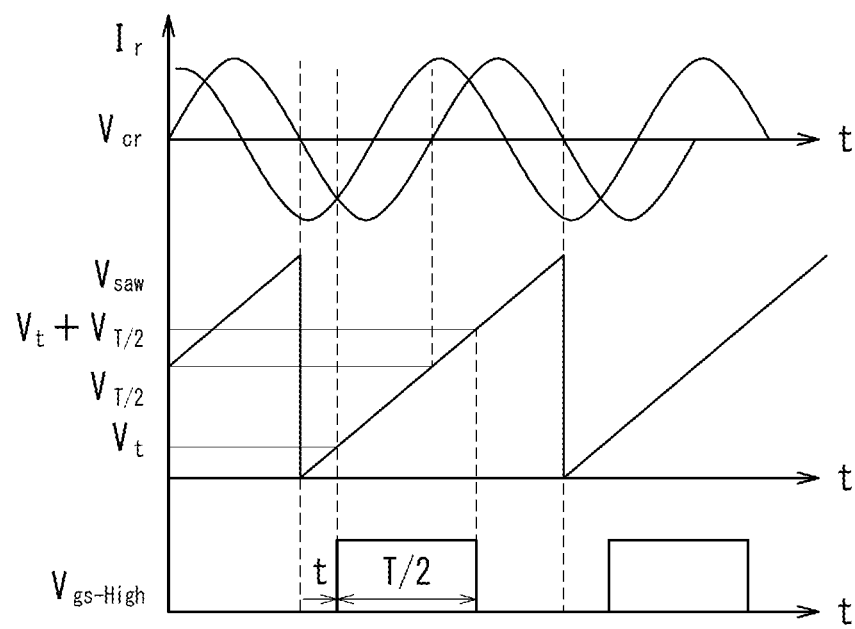
FIG. 25 is a graph showing an example of waveforms relating to the controller provided in the control system according to the present disclosure.

FIG. 25 is a graph showing an example of waveforms relating to the controller 2 provided in the control system CS according to the present disclosure. FIG. 25 shows the primary current $I_r$, the resonant capacitor voltage $V_{cr}$, the sawtooth wave voltage $V_{saw}$, and the switching signal $V_{gs-High}$, with their changes over time. In the graph, the horizontal axis indicates the time t, and the vertical axis indicates the above-mentioned current, voltages, and signal. As shown by the graph in FIG. 25, the sawtooth wave voltage $V_{saw}$ increases proportionately to the elapsed time from the reference phase of the primary current $I_r$ until its next reference phase. After a predetermined elapsed time t has passed from the reference phase, the sawtooth wave voltage $V_{saw}$ reaches the target phase difference voltage $V_t$, and the level of the switching signal $V_{gs-High}$ is changed to high. Later, when a half cycle has passed since the level of the switching signal $V_{gs-High}$ was changed to high, the sawtooth wave voltage $V_{saw}$ reaches the sum of the target phase difference voltage $V_t$ and the T/2 voltage $V_{T2}$, and the level of the switching signal $V_{gs-High}$ is changed to low.

Figure 26:
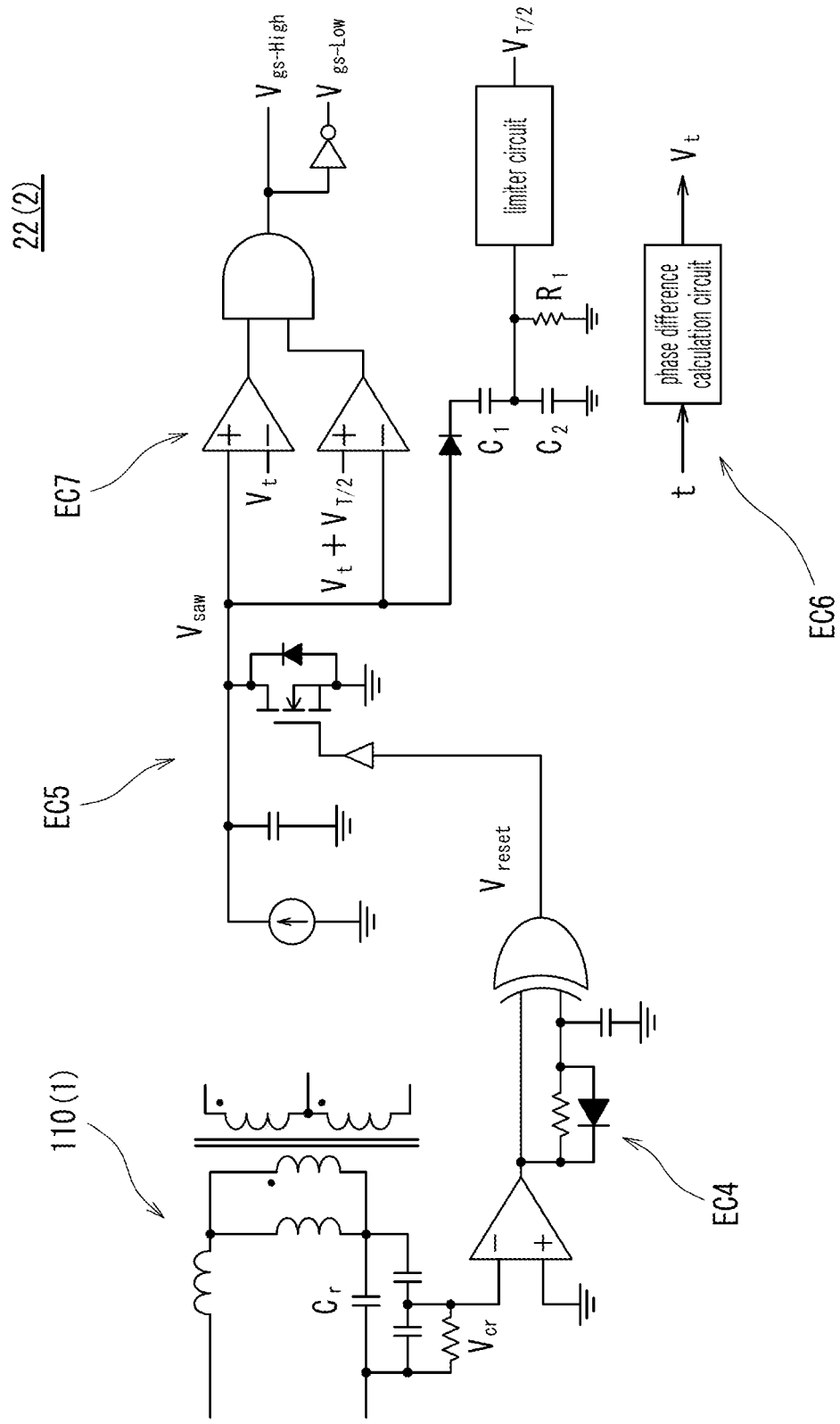
FIG. 26 is a circuit diagram showing a circuit example implementable in the controller provided in the control system according to the present disclosure.

FIG. 26 is a circuit diagram showing a circuit example implementable in the controller 2 provided in the control system CS according to the present disclosure. The example shown in FIG. 26 is a combination of the reference phase acquisition circuit EC4, the waveform generation circuit EC5, the phase difference calculation circuit EC6, and the switching signal output circuit EC7. For convenience of illustration, the phase difference calculation circuit EC6 is separated from the other circuits, but actually the target phase difference voltage $V_t$ is output from the phase difference calculation circuit EC6 to the switching signal output circuit EC7. The reference phase acquisition circuit EC4, the waveform generation circuit EC5, the phase difference calculation circuit EC6, and the switching signal output circuit EC7 illustrated in FIG. 26 are incorporated in the control signal output circuit 22 for controlling the voltage generation circuit, and thus implemented in the controller 2.

The reference phase acquisition circuit EC4 is connected to the resonant capacitor $C_r$ in the voltage generation circuit 110 and detects the resonant capacitor voltage $V_{cr}$. The circuits illustrated in FIG. 26 acquire a divided voltage from the detection capacitors that are connected in parallel with the resonant capacitor $C_r$.

The reference phase acquisition circuit EC4 receives an input of the resonant capacitor voltage $V_{cr}$, and outputs the reference phase signal $V_{reset}$ that represents the reference phase to the waveform generation circuit EC5. The waveform generation circuit EC5 receives an input of the reference phase signal $V_{reset}$, and outputs the sawtooth wave voltage $V_{saw}$ to the switching signal output circuit EC7. The sawtooth wave voltage $V_{saw}$ serves as a replacement value for the time elapsed from the reference phase. The phase difference calculation circuit EC6 receives an input of the target time difference (predetermined elapsed time t from the reference phase) corresponding to the desired phase difference, and outputs the target phase difference voltage $V_t$ to the switching signal output circuit EC7. The switching signal output circuit EC7 receives inputs of the sawtooth wave voltage $V_{saw}$ and the target phase difference voltage $V_t$, and outputs the switching signals $V_{gs-High}$, $V_{gs-Low}$ to the voltage generation circuit 110.

In the manner described above, the control system CS according to the second embodiment controls the phase of the converter 1, and thereby achieves the power factor control based on the phase control.

<Simulation Results>

To compare the performance, the power factor control and the frequency control were applied to the control system CS according to the present disclosure. The method for the power factor control was based on the phase control described in the second embodiment. In both of the power factor control and the frequency control, the same converter 1 was used under the following conditions.

Figure 27:
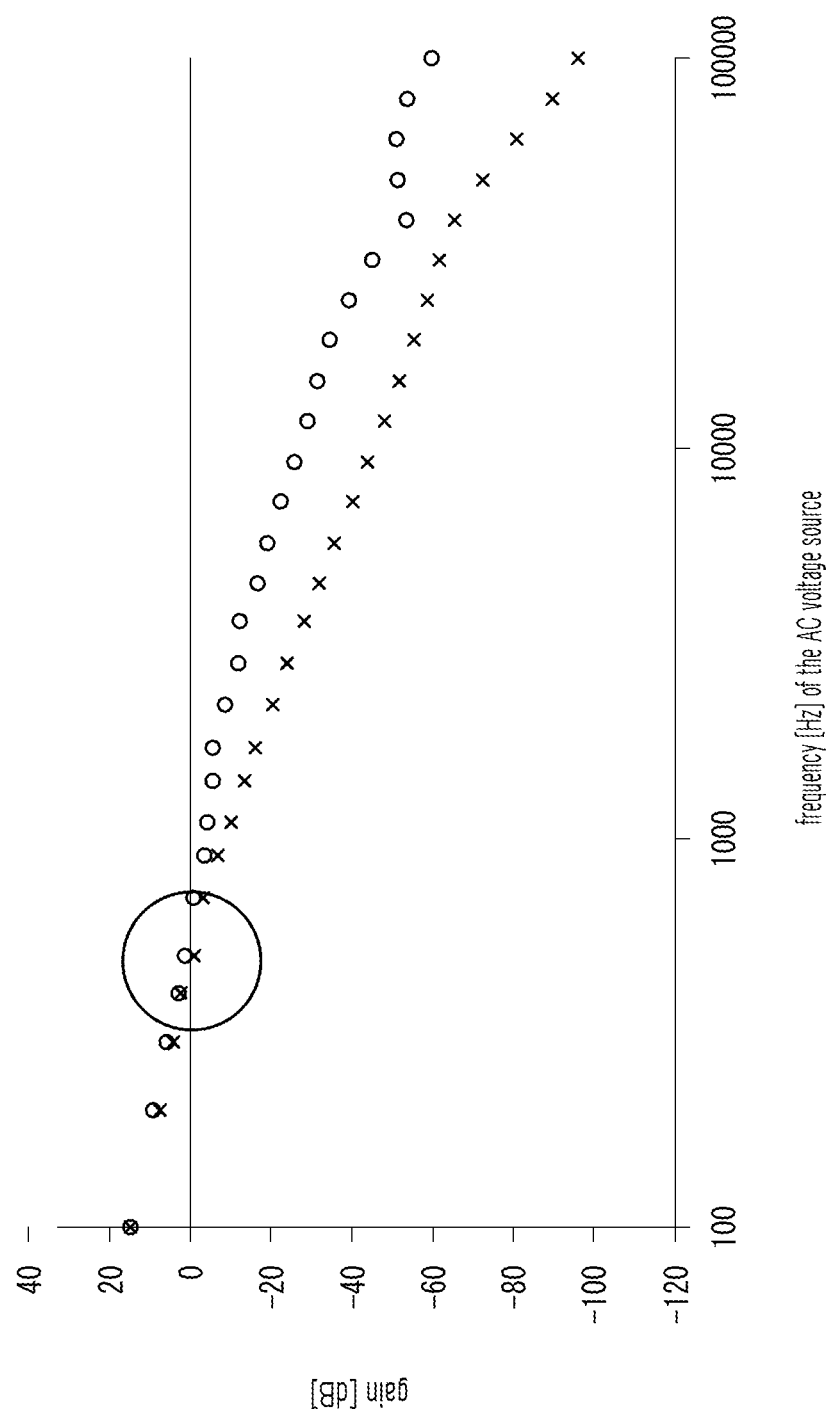
FIG. 27 is a graph showing an example of simulation conditions for the control system according to the present disclosure.

Input voltage: 100 [V] AC, to be rectified into DC
Resonant capacitor: 125 [nF]
Leakage inductance in the primary circuit: 20 [uH]
Magnetizing inductance: 40 [uH]
Leakage inductance in the secondary circuit: 0.0001 [nH]
Turns ratio: 2:1:1
Output capacitor: 12.5 [uF]
Output voltage: 12.5 [V] DC FIG. 27 a graph showing an example of simulation conditions for the control system CS according to the present disclosure. FIG. 27 shows the first order transfer functions for the power factor control and the frequency control, where the horizontal axis indicates the frequency [Hz] of the AC voltage source and the vertical axis indicates the gain [dB]. In this graph, the symbol "○" represents the first order transfer function for the power factor control, and the symbol "×" represents the first order transfer function for the frequency control. As a condition for the comparative experiment between the power factor control and the frequency control, the respective crossover frequencies (circled in the graph of FIG. 27) were matched substantially so as to avoid a difference in control response speed.

Figure 28:
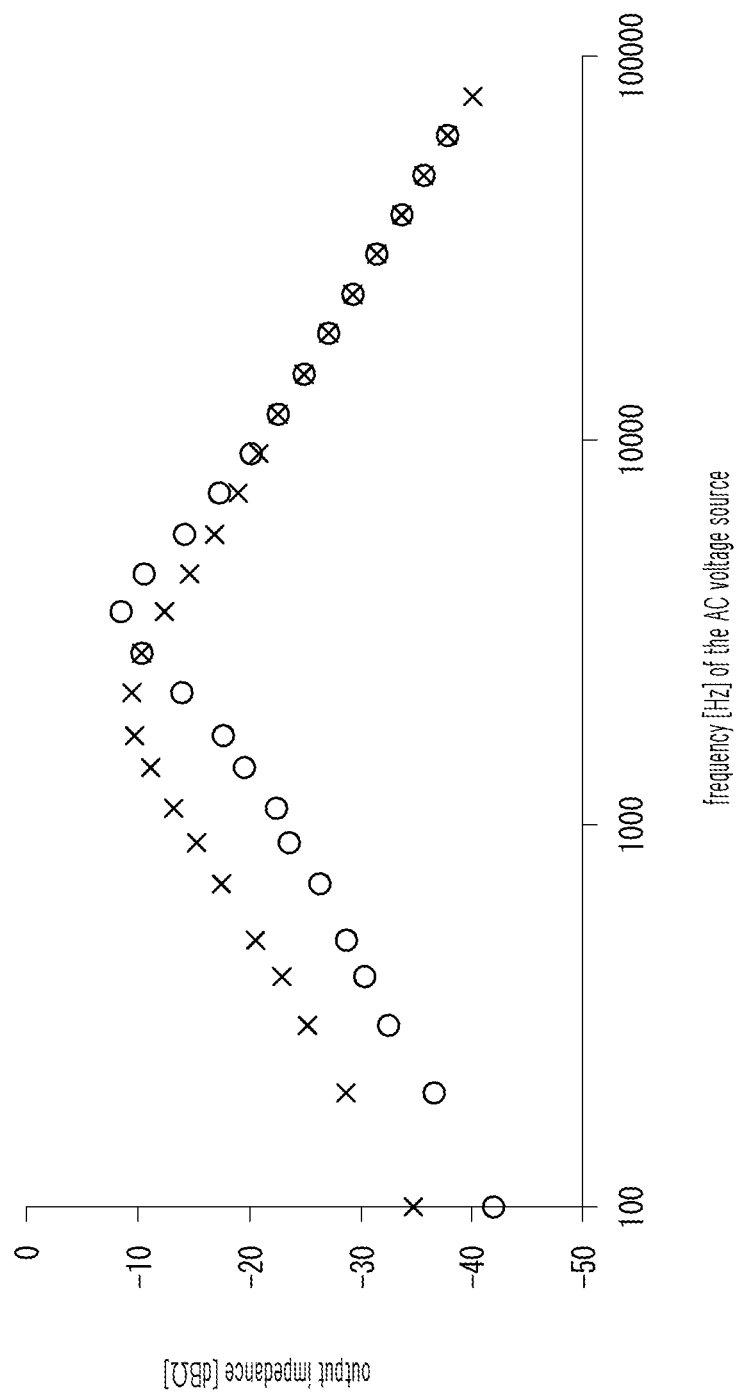
FIG. 28 is a graph showing an example of simulation results in the control system according to the present disclosure.
Figure 29:
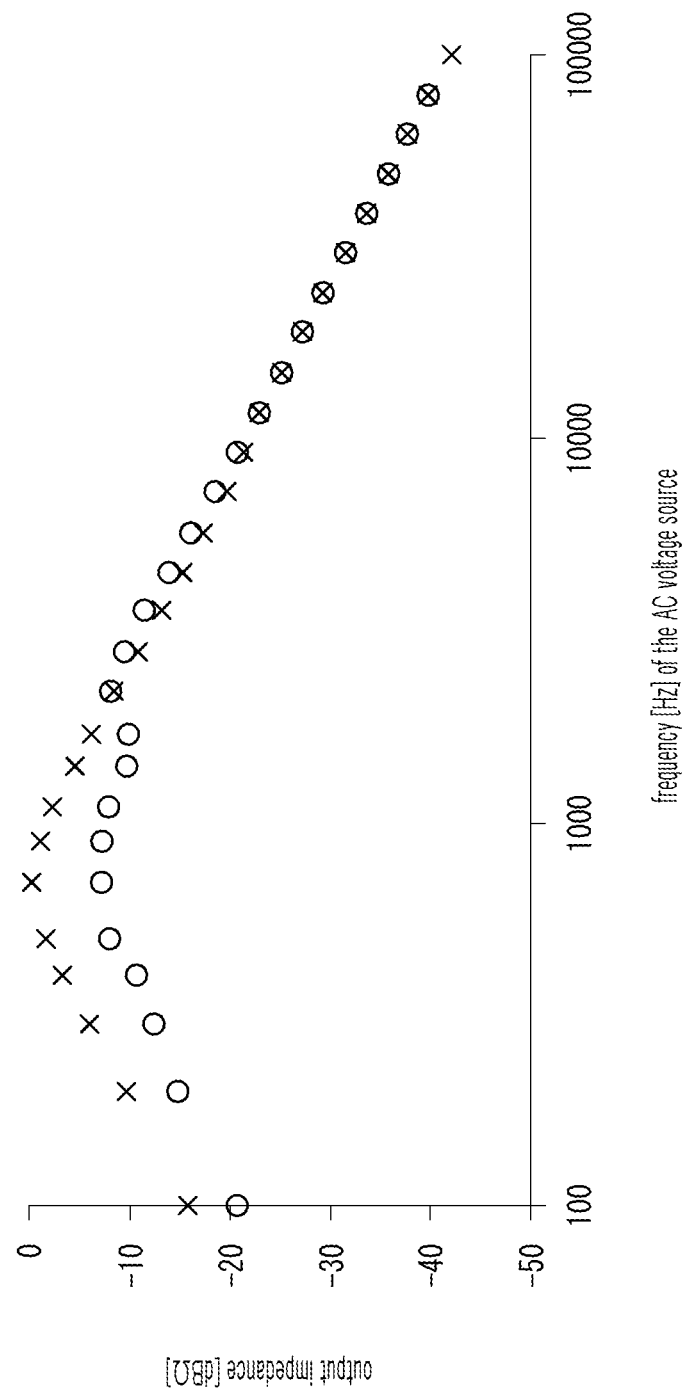
FIG. 29 is a graph showing an example of simulation results in the control system according to the present disclosure.
Figure 30:
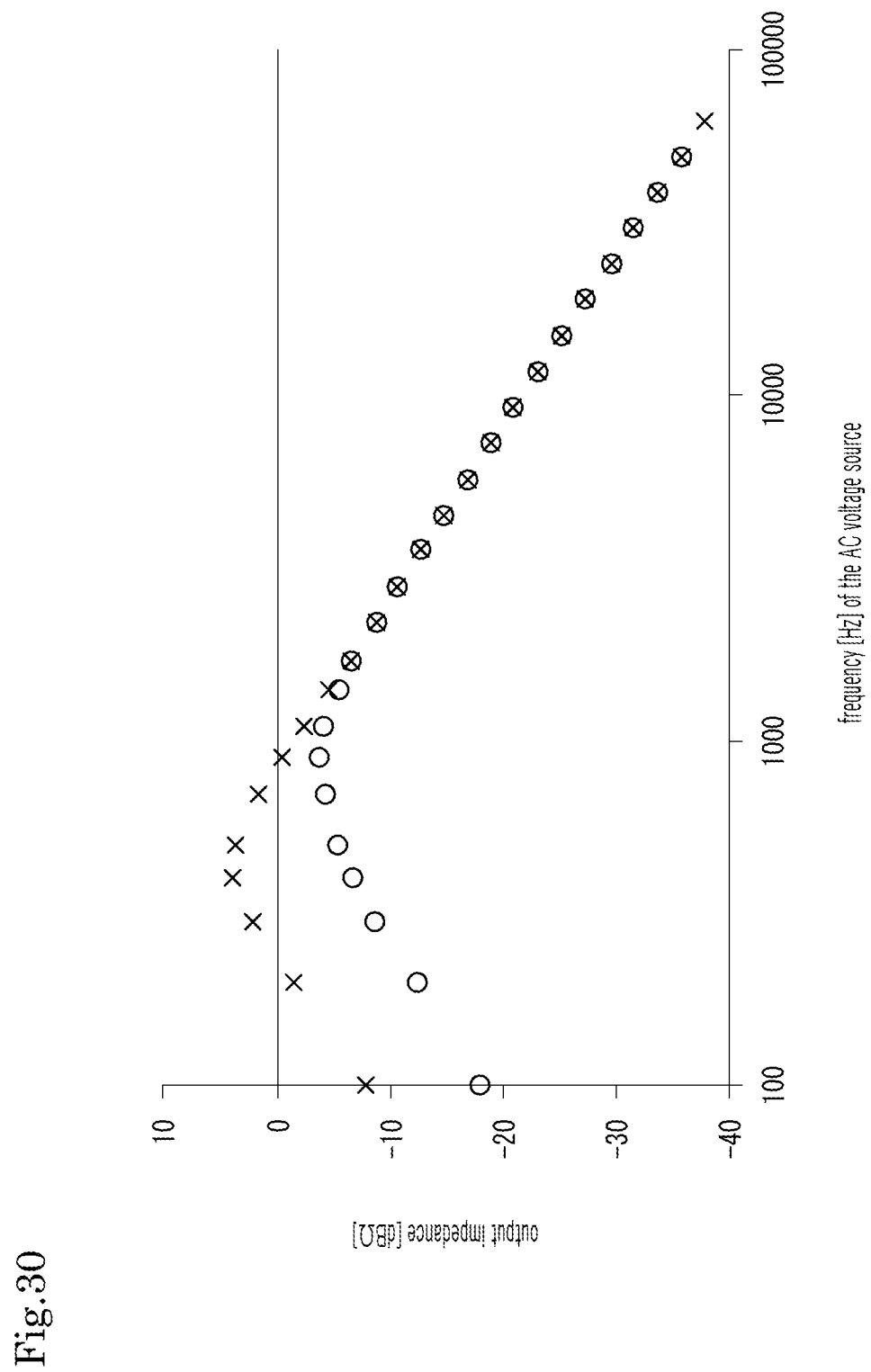
FIG. 30 is a graph showing an example of simulation results in the control system according to the present disclosure.

FIGS. 28 to 30 are graphs showing examples of simulation results in the control system CS according to the present disclosure. FIGS. 28 to 30 show frequency characteristics with respect to the load $R_L$ under the power factor control and the frequency control, where the horizontal axis indicates the frequency [Hz] of the AC current source and the vertical axis indicates the output impedance [dBΩ]. FIGS. 28, 29, and 30 show frequency characteristics with the loads $R_L$ of 0.5 [Ω], 2.0 [Ω], and 4.0 [Ω], respectively. In these graphs, the symbol "○" represents frequency characteristics of the output impedance under the power factor control, and the symbol "×" represents frequency characteristics of the output impedance under the frequency control. As shown in FIGS. 28 to 30, the power factor control can keep lower output impedances for all types of loads $R_L$. This tendency is particularly noticeable in the low-frequency band.

Figure 31:
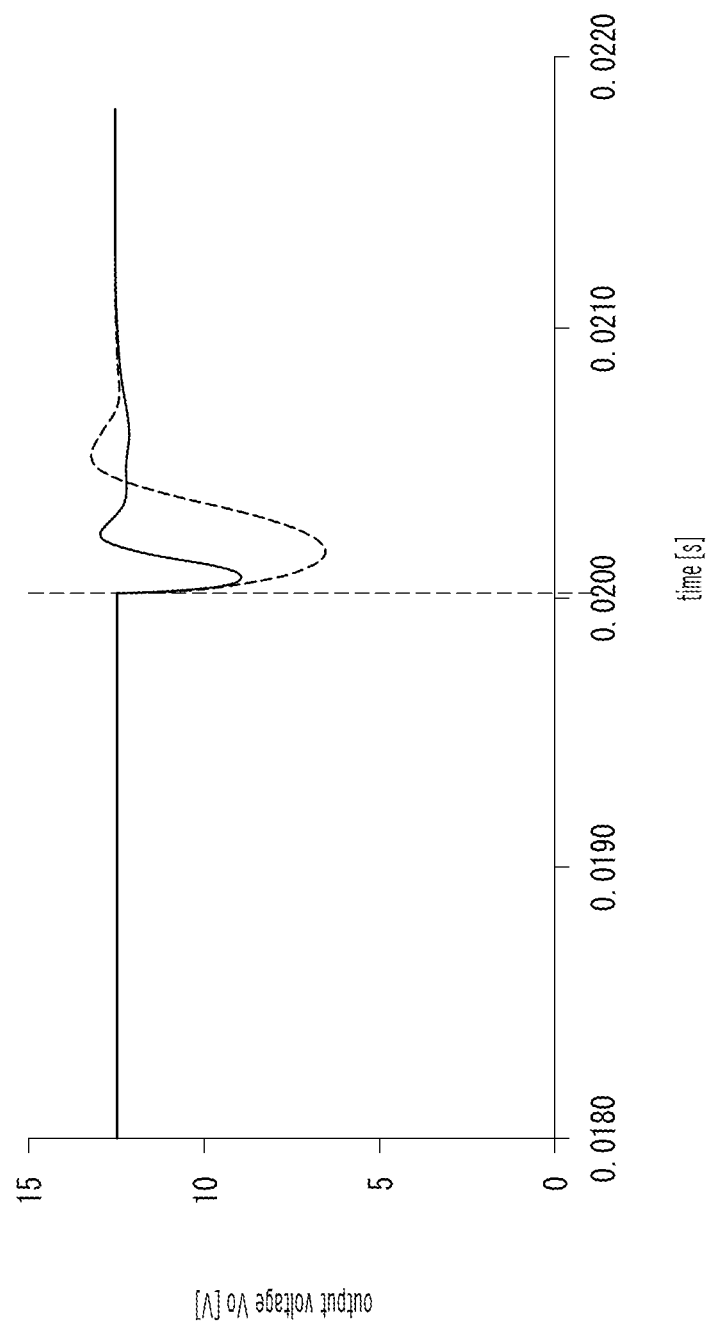
FIG. 31 is a graph showing an example of simulation results in the control system according to the present disclosure.
Figure 32:
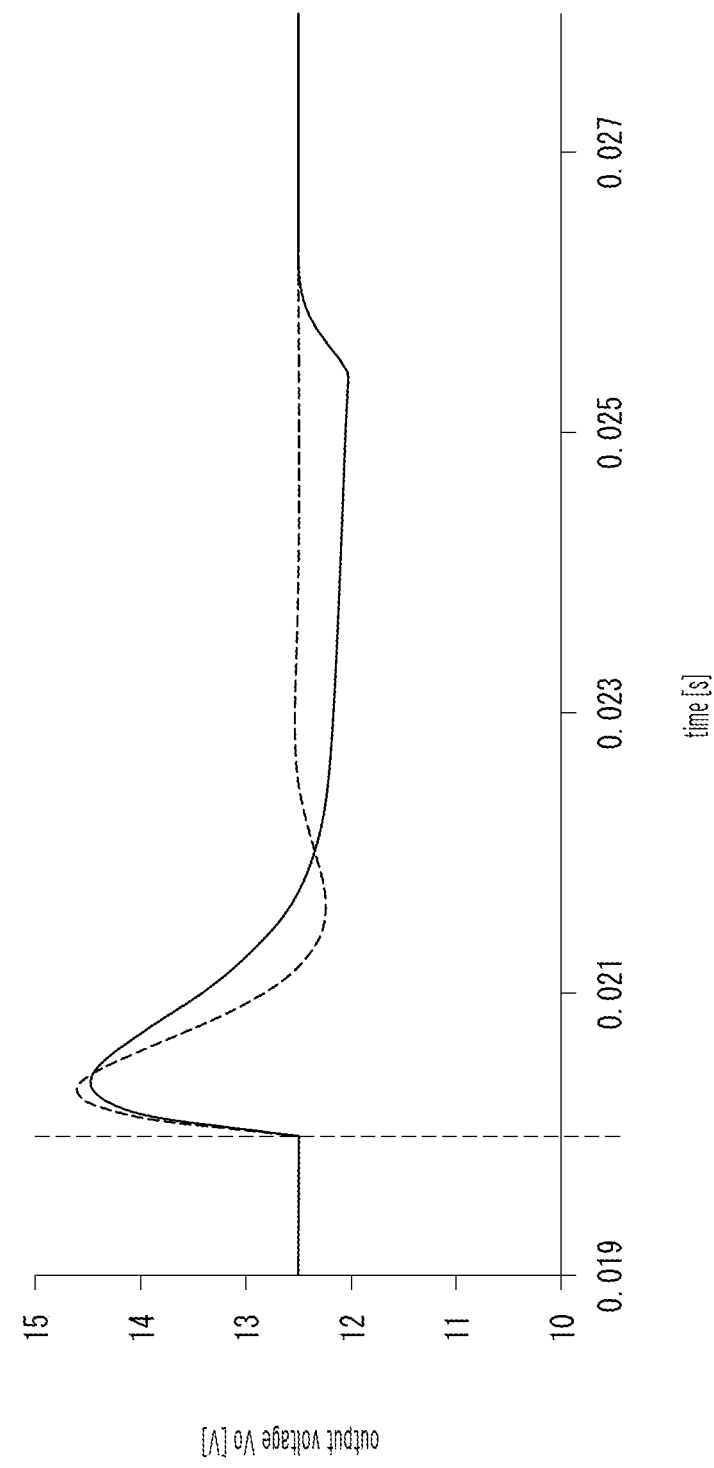
FIG. 32 is a graph showing an example of simulation results in the control system according to the present disclosure.

FIGS. 31 and 32 are graphs showing examples of simulation results in the control system CS according to the present disclosure. FIGS. 31 and 32 show responsiveness to the load $R_L$ under the power factor control and the frequency control, where the horizontal axis indicates the time [s] and the vertical axis indicates the output voltage $V_o$ [V]. FIG. 31 shows responsiveness when the load $R_L$ changed stepwise from 2 [Ω] to 0.5 [Ω] at 0.020 [s]. FIG. 32 shows responsiveness when the load $R_L$ changed stepwise from 2 [Ω] to 4 [Ω] at 0.020 [s]. In each graph, the solid line represents the output voltage $V_o$ that changed over time under the power factor control, and the dashed line represents the output voltage $V_o$ that changed over time under the frequency control. As shown in FIGS. 31 and 32, the power factor control responded more quickly to the load changes, both the increase and decrease in the load, than the frequency control.

The control method according to the present disclosure has been described by way of the examples in the first and second embodiments above. In this control method, the converter 1 including the resonant circuit 111 such as the LLC converter is controlled by the power factor-based control. As a result, the control method according to the present disclosure provides remarkable effects and, for example, is expected to improve load responsiveness.

The present invention is not limited to the above-described embodiments, and can be embodied and practiced in other different forms. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

For example, the above embodiments relate to the examples of the power factor control based on the voltage control and the power factor control based on the phase control. However, the present invention is not limited to such examples and can be developed to implement the power factor control in various manners.

Further, for example, the above embodiments relate to the examples using an LLC converter as the resonant circuit 111. However, the present invention is not limited to such examples, and can be embodied with use of various types of resonant circuit 111 such as a CLLC converter. Alternatively, the resonant circuit 111 may be a circuit without a transformer such as a non-isolated resonant converter, in which case the LC resonant circuit is directly subjected to rectification to produce an output.

Further, for example, the above embodiments relate to the examples in which the current through the resonant circuit is converted to a DC voltage by the rectifier circuit and the rectified DC voltage is output through the output circuit. However, the output does not necessarily have to be the DC voltage and, for example, may be an unrectified AC voltage. Alternatively, the output may be an alternating current flowing through the resonant circuit.

Further, the present invention is also applicable to, for example, a magnetic resonant wireless power feeding device, which is a power converter that excites resonance between a transmitter coil and a resonant capacitor by using an inverter and that transmits power to a remote receiver by using an AC magnetic field generated by a resonant current. In this case, the present invention is applied in order to control an amplitude of the resonant current at a given value, and is configured to set the control target power factor in accordance with a difference between the amplitude of the resonant current and a target amplitude of the resonant current.

In the above embodiments, the target power factor is set in accordance with the difference between the DC output voltage and its target value, but this is not necessarily the case. For example, when the output is an AC voltage, the target power factor may be set in accordance with a difference between an output AC amplitude and its target value. Alternatively, the target power factor may be set in accordance with a difference between an output current (e.g., an output direct current or an output alternating current) and its target value, or in accordance with a difference between power (e.g., DC power or AC power) and its target value. Furthermore, the target power factor may be set in accordance with the difference from any of the above-mentioned target values together with an additional value, rather than the difference alone. A possible example is to subject the difference between the DC output voltage and its target value to proportional and integral actions, then to add/subtract, to/from the resulting value, a value corresponding to the amplitude of the resonant current, and finally to set the power factor in accordance with a value resulting from the addition/subtraction.

Further, the above embodiments use a half-bridge circuit as the switching circuit. However, the switching circuit in the present invention is not necessarily limited thereto, and may be a full-bridge circuit or a circuit capable of outputting a freely-selected AC voltage. Furthermore, the voltage generation circuit does not necessarily have to be a switching circuit, but may be any circuit capable of generating a voltage that contains an alternating current for driving the resonant circuit 111.

The various circuits described in the above embodiments can be also implemented as their equivalent circuits.

REFERENCE SIGNS LIST

CS control system
1 converter
10 input power source
11 primary circuit
110 voltage generation circuit
111 resonant circuit
12 coupling circuit
13 secondary circuit
2 controller
20 comparator unit
21 target control unit
22 control signal output circuit for controlling the voltage generation circuit
EC1 amplitude acquisition circuit
EC2 control target derivation circuit
EC3 switching signal output circuit
EC4 reference phase acquisition circuit
EC5 waveform generation circuit
EC6 phase difference calculation circuit
EC7 switching signal output circuit

What is claimed is:

1. A controller for controlling a power converter that includes a voltage generation circuit for generating a voltage waveform containing an alternating current and a resonant circuit for converting the generated voltage waveform,
the controller comprising:
a voltage generation circuit control unit that controls the voltage generation circuit by a control target power factor corresponding to a control target voltage that is a desired value for control,
wherein
the voltage generation circuit control unit comprises:
a reference phase acquisition circuit that acquires a voltage across a resonant capacitor provided in the resonant circuit and then acquires a reference phase based on the voltage across the resonant capacitor, the reference phase serving as a reference for a phase of a current through the resonant circuit;
a waveform generation circuit that generates, from the reference phase acquired by the reference phase acquisition circuit, a time-varying waveform that changes over time;
a phase difference calculation circuit that calculates, based on a target phase difference that is a desired phase difference and also based on the time-varying waveform generated by the waveform generation circuit, a target value in the time-varying waveform as a value corresponding to the target phase difference; and a control signal output circuit for controlling the voltage generation circuit, the control signal output circuit outputting at least one voltage generation circuit control signal for controlling the voltage generation circuit, based on the time-varying waveform generated by the waveform generation circuit and the target value calculated by the phase difference calculation circuit, the waveform generation circuit generates a sawtooth wave as the time-varying waveform, a voltage of the sawtooth wave changing over time along a substantially uniform slope in a time period from the reference phase acquired by the reference phase acquisition circuit until a next reference phase, the phase difference calculation circuit calculates a value of a voltage corresponding to the target phase difference as a target phase difference voltage, in the voltage of the sawtooth wave that changes over time along the substantially uniform slope, and the control signal output circuit for controlling the voltage generation circuit outputs the at least one voltage generation circuit control signal, based on a result of a comparison in which the voltage of the sawtooth wave generated by the waveform generation circuit is compared with the target phase difference voltage calculated by the phase difference calculation circuit.

2. The controller according to claim 1, wherein
the voltage generation circuit control unit controls the voltage generation circuit such that a derived power factor achieves the control target power factor, and
the derived power factor is derived in the resonant circuit, from an active power and an apparent power relevant to an alternating current wave supplied from the voltage waveform generated by the voltage generation circuit.

3. The controller according to claim 1, wherein
the voltage generation circuit control unit controls the voltage generation circuit, based on a derived power factor, and
the derived power factor is derived as a ratio of an active power to an apparent power, the active power being derived from the voltage across the resonant capacitor provided in the resonant circuit or the current through the resonant circuit and from the voltage waveform that is generated in the voltage generation circuit and that changes over time, the apparent power being derived from the voltage across the resonant capacitor and an amplitude of the resonant capacitor.

4. The controller according to claim 1, wherein
the voltage generation circuit control unit comprises:
an amplitude acquisition circuit that acquires the voltage across the resonant capacitor provided in the resonator circuit and then acquires, from the voltage across the resonant capacitor, an amplitude of the resonant capacitor voltage;
a control target derivation circuit that derives, from the amplitude of the voltage across the resonant capacitor, a control target resonant capacitor voltage that is the desired value for control;
and
the control signal output circuit for controlling the voltage generation circuit, the control signal output circuit outputting the at least one voltage generation circuit control signal for controlling the voltage generation circuit, based on a result of a comparison in which an absolute value of the voltage across the resonant capacitor is compared with the control target resonant capacitor voltage derived by the control target derivation circuit.

5. The controller according to claim 1, wherein
the voltage generation circuit control unit controls the voltage generation circuit such that a derived power factor achieves the control target power factor, and
the derived power factor is derived from the current through the resonant circuit.

6. A control system comprising:
the controller according to claim 1 for controlling the voltage generation circuit; and
the power converter that includes the voltage generation circuit for generating the voltage waveform containing the alternating current and the resonant circuit for converting the generated voltage waveform.

7. A controller for controlling a power converter that includes a voltage generation circuit for generating a voltage waveform containing an alternating current and a resonant circuit for converting the generated voltage waveform,
the controller comprising:
a comparator unit that compares a value relating to an output from the power converter, with a target value thereof;
a target control unit that derives a control target voltage that is a desired value for control, based on a result of a comparison by the comparator unit; and
a voltage generation circuit control unit that controls the voltage generation circuit by a control target power factor corresponding to the control target voltage derived by the target control unit, wherein
the voltage generation circuit control unit comprises:
a reference phase acquisition circuit that acquires a voltage across a resonant capacitor provided in the resonant circuit and then acquires a reference phase based on the voltage across the resonant capacitor, the reference phase serving as a reference for a phase of a current through the resonant circuit;
a waveform generation circuit that generates, from the reference phase acquired by the reference phase acquisition circuit, a time-varying waveform that changes over time;
a phase difference calculation circuit that calculates, based on a target phase difference that is a desired phase difference and also based on the time-varying waveform generated by the waveform generation circuit, a target value in the time-varying waveform as a value corresponding to the target phase difference; and
a control signal output circuit for controlling the voltage generation circuit, the control signal output circuit outputting at least one voltage generation circuit control signal for controlling the voltage generation circuit, based on the time-varying waveform generated by the waveform generation circuit and the target value calculated by the phase difference calculation circuit,
the waveform generation circuit generates a sawtooth wave as the time-varying waveform, a voltage of the sawtooth wave changing over time along a substantially uniform slope in a time period from the reference phase acquired by the reference phase acquisition circuit until a next reference phase,
the phase difference calculation circuit calculates a value of a voltage corresponding to the target phase difference as a target phase difference voltage, in the voltage of the sawtooth wave that changes over time along the substantially uniform slope,
and
the control signal output circuit for controlling the voltage generation circuit outputs the at least one voltage generation circuit control signal, based on a result of a comparison in which the voltage of the sawtooth wave generated by the waveform generation circuit is compared with the target phase difference voltage calculated by the phase difference calculation circuit.

8. The controller according to claim 7, wherein
the voltage generation circuit control unit controls the voltage generation circuit such that a derived power factor achieves the control target power factor, and
the derived power factor is derived in the resonant circuit, from an active power and an apparent power relevant to an alternating current wave supplied from the voltage waveform generated by the voltage generation circuit.

9. The controller according to claim 7, wherein
the voltage generation circuit control unit controls the voltage generation circuit, based on a derived power factor, and
the derived power factor is derived as a ratio of an active power to an apparent power, the active power being derived from the voltage across the resonant capacitor provided in the resonant circuit or the current through the resonant circuit and from the voltage waveform that is generated in the voltage generation circuit and that changes over time, the apparent power being derived from the voltage across the resonant capacitor and an amplitude of the resonant capacitor.

10. The controller according to claim 7, wherein
the voltage generation circuit control unit comprises:
an amplitude acquisition circuit that acquires the voltage across the resonant capacitor provided in the resonator circuit and then acquires, from the voltage across the resonant capacitor, an amplitude of the resonant capacitor voltage;
a control target derivation circuit that derives, from the amplitude of the voltage across the resonant capacitor, a control target resonant capacitor voltage that is the desired value for control; and
the control signal output circuit for controlling the voltage generation circuit, the control signal output circuit outputting the at least one voltage generation circuit control signal for controlling the voltage generation circuit, based on a result of a comparison in which an absolute value of the voltage across the resonant capacitor is compared with the control target resonant capacitor voltage derived by the control target derivation circuit.

11. The controller according to claim 7, wherein
the voltage generation circuit control unit controls the voltage generation circuit such that a derived power factor achieves the control target power factor, and
the derived power factor is derived from the current through the resonant circuit.

12. A control system comprising:
the controller according to claim 7 for controlling the voltage generation circuit; and
the power converter that includes the voltage generation circuit for generating the voltage waveform containing the alternating current and the resonant circuit for converting the generated voltage waveform.

* * * * *